US012417137B2

(12) United States Patent
Zhu et al.

(10) Patent No.: US 12,417,137 B2
(45) Date of Patent: Sep. 16, 2025

(54) DETECTING HARDWARE FAULTS IN DATA PROCESSING PIPELINES

(71) Applicant: NVIDIA Corporation, Santa Clara, CA (US)

(72) Inventors: Rongzhe Zhu, Shanghai (CN); Shangang Zhang, Suzhou (CN); Nagaraju Balasubramanya, Fremont, CA (US); Jinyue Lu, Shanghai (CN); Tinghai Miao, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/073,060

(22) Filed: Dec. 1, 2022

(65) Prior Publication Data

US 2023/0350744 A1    Nov. 2, 2023

Related U.S. Application Data

(63) Continuation of application No. PCT/CN2022/090219, filed on Apr. 29, 2022.

(51) Int. Cl.
*G06F 11/00* (2006.01)
*G06F 11/07* (2006.01)

(52) U.S. Cl.
CPC ...... *G06F 11/0772* (2013.01); *G06F 11/0787* (2013.01); *G06F 11/079* (2013.01)

(58) Field of Classification Search
CPC . G06F 11/0772; G06F 11/0787; G06F 11/079
USPC ...................................................... 714/1–57
See application file for complete search history.

(56) References Cited

U.S. PATENT DOCUMENTS

| 5,168,499 A | 12/1992 | Peterson et al. | |
|---|---|---|---|
| 6,587,970 B1 * | 7/2003 | Wang | G06F 11/2025 714/E11.073 |
| 6,732,300 B1 * | 5/2004 | Freydel | G06F 11/0763 714/36 |
| 7,308,492 B2 * | 12/2007 | Konopka | H04L 63/0428 714/25 |
| 7,320,114 B1 * | 1/2008 | Jain | G06F 11/263 716/139 |
| 9,471,153 B1 * | 10/2016 | Ivanchenko | G06T 7/70 |

(Continued)

FOREIGN PATENT DOCUMENTS

| CN | 1734424 A | 2/2006 |
|---|---|---|
| CN | 105843699 A | 8/2016 |

(Continued)

OTHER PUBLICATIONS

Chen et al., "Hsiao-Code Check Matrices and Recursively Balanced Matrices," Mar. 8, 2008, 8 pages.

(Continued)

*Primary Examiner* — Sarai E Butler
(74) *Attorney, Agent, or Firm* — Davis Wright Tremaine LLP

(57) ABSTRACT

In various examples, a system comprising at least one circuit to detect whether a fault has occurred during performance of an operation by the at least one circuit. In at least some embodiments, the at least one circuit generates error detecting values and determines a fault has occurred when the error detecting values do not match predetermined error detecting data.

32 Claims, 14 Drawing Sheets

(56) References Cited

U.S. PATENT DOCUMENTS

| | | | | |
|---|---|---|---|---|
| 10,885,698 | B2 | 1/2021 | Muthler et al. | |
| 2003/0051186 | A1* | 3/2003 | Boudnik | G06F 11/3688 |
| | | | | 717/124 |
| 2004/0199824 | A1* | 10/2004 | Harter | G06F 11/27 |
| | | | | 714/E11.169 |
| 2007/0061693 | A1* | 3/2007 | Wickeraad | G06F 11/1064 |
| | | | | 714/801 |
| 2008/0010576 | A1* | 1/2008 | Urabe | G01R 31/3016 |
| | | | | 714/738 |
| 2009/0259457 | A1* | 10/2009 | Quennesson | G06F 11/261 |
| | | | | 703/23 |
| 2010/0287421 | A1* | 11/2010 | Golowner | G05B 9/03 |
| | | | | 714/48 |
| 2012/0030519 | A1* | 2/2012 | Wilt | G06F 11/1637 |
| | | | | 712/216 |
| 2012/0036398 | A1* | 2/2012 | Moyer | G06F 9/505 |
| | | | | 714/48 |
| 2013/0339782 | A1* | 12/2013 | Beverly | G06F 11/0748 |
| | | | | 714/4.4 |
| 2014/0019815 | A1* | 1/2014 | Bull | G06F 11/0721 |
| | | | | 714/E11.143 |
| 2014/0215270 | A1* | 7/2014 | Kiffmeier | G06F 11/263 |
| | | | | 714/29 |
| 2014/0344619 | A1* | 11/2014 | Kwon | G06F 11/1641 |
| | | | | 714/11 |
| 2014/0344623 | A1* | 11/2014 | Han | G06F 11/0751 |
| | | | | 714/37 |
| 2015/0293173 | A1* | 10/2015 | Tsuboi | G06F 11/08 |
| | | | | 714/727 |
| 2015/0293827 | A1* | 10/2015 | Han | G06F 11/2215 |
| | | | | 714/41 |
| 2016/0055047 | A1* | 2/2016 | Okamoto | G06F 11/1641 |
| | | | | 714/57 |
| 2016/0117217 | A1* | 4/2016 | Anand | G06F 11/1004 |
| | | | | 714/57 |
| 2018/0080984 | A1* | 3/2018 | Tsuboi | G06F 11/08 |
| 2019/0051370 | A1 | 2/2019 | Azam et al. | |
| 2019/0258251 | A1 | 8/2019 | Ditty et al. | |
| 2020/0241945 | A1* | 7/2020 | Sterioff | G06F 11/0787 |
| 2020/0319969 | A1* | 10/2020 | Chu | G06F 11/1076 |
| 2021/0035381 | A1* | 2/2021 | Wu | G05B 23/0208 |
| 2021/0261159 | A1* | 8/2021 | Pazhayampallil | B60W 30/0956 |

FOREIGN PATENT DOCUMENTS

| | | |
|---|---|---|
| CN | 111212775 A | 5/2020 |
| CN | 111885368 A | 11/2020 |
| EP | 0080354 A2 | 6/1983 |
| EP | 2930524 A1 | 10/2015 |
| JP | 2009223506 A | 10/2009 |
| JP | 2014146110 A | 8/2014 |

OTHER PUBLICATIONS

International Search Report and Written Opinion for Application No. PCT/CN2022/090219, mailed Jan. 29, 2023, filed Apr. 29, 2022, 11 pages.

Koopman et al., "Cyclic Redundancy Code (CRC) Polynomial Selection For Embedded Networks," The International Conference on Dependable Systems and Networks, 2004, 11 pages.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

* cited by examiner

DETECTING HARDWARE FAULTS IN DATA PROCESSING PIPELINES

CLAIM OF PRIORITY

This application is a continuation of International PCT Patent Application No. PCT/CN2022/090219 titled "Detecting Hardware Faults in Data Processing Pipelines," filed Apr. 29, 2022, the entire contents of which is incorporated herein by reference.

TECHNICAL FIELD

At least one embodiment pertains to a hardware diagnostic circuit that may be used to detect hardware faults in a target system. For example, at least one embodiment pertains to including error detection hardware within a data processing unit of a System on a Chip that implements various novel techniques described herein. By way of another example, at least one embodiment pertains to an autonomous vehicle including such a System on a Chip.

BACKGROUND

Hardware faults may be classified as being transient or permanent. Transient hardware faults include one or more bits of data being corrupted (e.g., flipped) and may be caused by electromagnetic interference. Thus, the cause of transient hardware faults may be temporary. On the other hand, permanent hardware faults may be caused by hardware issues that are longer lasting, or even persist indefinitely (e.g., until repaired). An example of a permanent hardware fault may include a short circuit or an open circuit that causes a conductor (e.g., a trace, a wire, a transmission line, and the like) to always carry a particular logical signal value (e.g., one or zero). Hardware faults may manifest in undesirable outcomes. For example, a bit being stuck at a particular value (e.g., one or zero) may be caused by a permanent hardware fault.

Functional safety is a concept whose objective is to achieve an absence of unreasonable risk due to faults caused by one or more malfunctions of a system at runtime. Functional safety operations attempt to reduce risk of harm potentially caused by faults to a tolerable or acceptable level. For example, error correction coding ("ECC") has been used to detect transient faults in data storage (e.g., memory) but may not be an effective method of detecting faults in processing logic. Software diagnostic methods that cause a target system to perform diagnostic operations may be used to detect some, but not all, transient and permanent faults in processing logic. Performing such diagnostic operations may also negatively impact system performance because, instead of performing functional operations, computing resources are tied up performing diagnostic operations.

BRIEF DESCRIPTION OF THE DRAWINGS

The present systems and methods for DETECTING HARDWARE FAULTS IN DATA PROCESSING PIPELINES are described in detail below with reference to the attached drawing figures, wherein.

DETAILED DESCRIPTION

Figure 1:
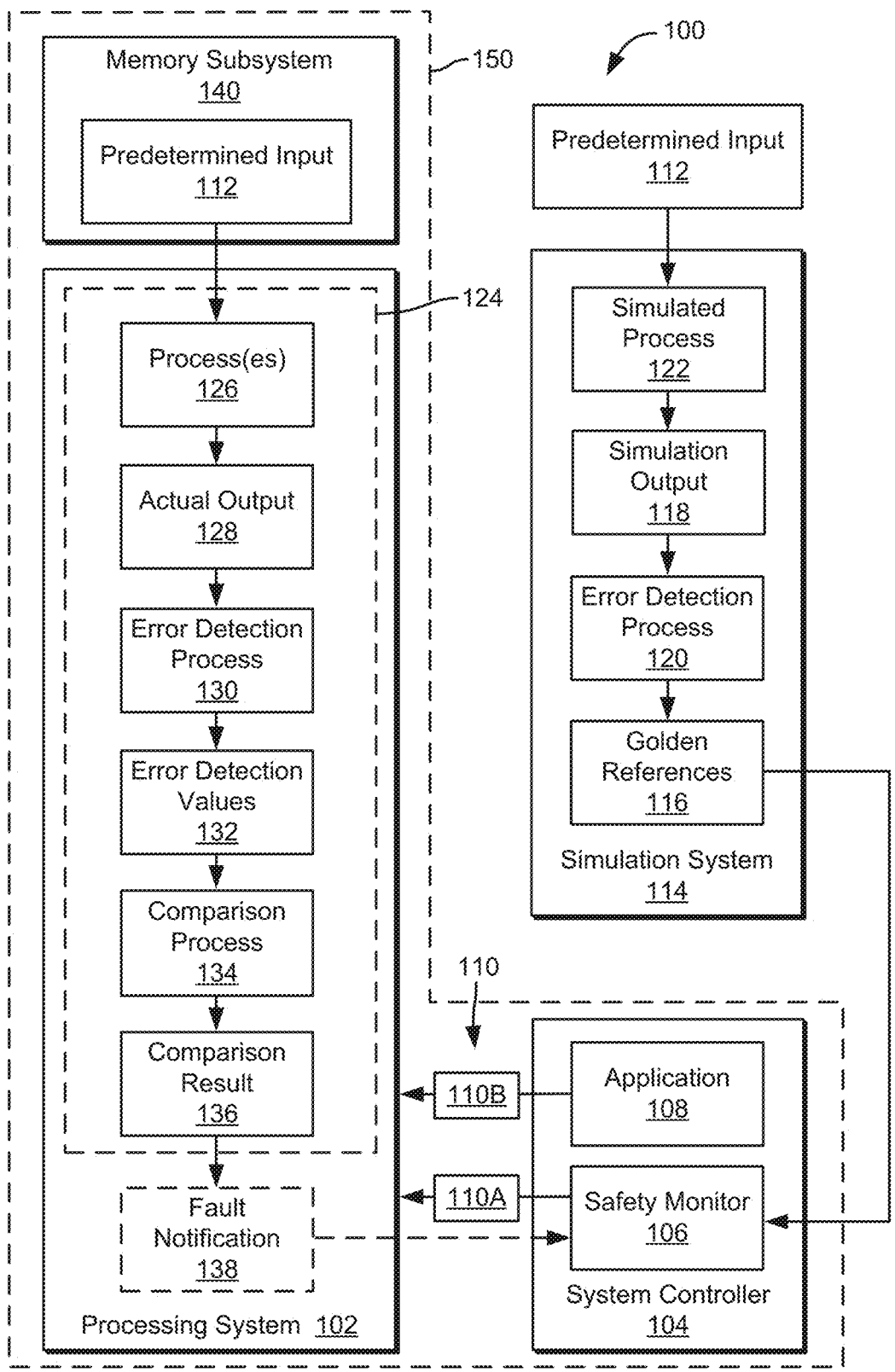
FIG. 1 is an illustration of a block diagram of an example system that detects hardware faults within a processing system, in accordance with some embodiments of the present disclosure.

FIG. 1 is an illustration of a block diagram of an example system 100 that detects hardware faults within a processing system 102, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In the embodiment illustrated in FIG. 1, the system 100 includes a system controller 104 that implements both a safety monitor 106 and an application 108. The system controller 104 sends one or more instructions 110 generated by the safety monitor 106 and/or the application 108 to the processing system 102. For example, the instruction(s) 110 may include an instruction 110A generated by the safety monitor 106 that instructs the processing system 102 to perform one or more diagnostic operations. The instruction 110A may include predetermined input 112 (e.g., test or diagnostic data) or references to one or more storage locations from which the predetermined input 112 may be obtained. The processing system 102 processes the predetermined input 112 in accordance with the diagnostic operation(s) identified in the instruction 110A. By way of another non-limiting example, the instruction(s) 110 may include an instruction 110B generated by the application 108 that instructs the processing system 102 to perform a functional operation (e.g., analyzing image data).

The system controller 104 that may be at least partially implemented by a circuit that includes one or more connections to the processing system 102, at least one processor, and memory (e.g., a non-transitory processor-readable medium) storing processor executable instructions to be executed by the processor(s). The safety monitor 106 and/or the application 108 may be implemented by processor executable instructions (e.g., stored in the memory of the system controller 104) executed by the processor(s) of the system controller 104 or at least one processor connected to the system controller 104. The safety monitor 106 may be implemented as a Permanent Fault Software Diagnostic ("PFSD") software application. Thus, the diagnostic operation(s) may include one or more PFSD tasks and the predetermined input 112 may be PFSD data. The application 108 may be implemented as one or more applications that at least partially implements at least one Advanced Driver Assistance Systems ("ADAS") within an autonomous vehicle. For example, the functional operation may at least partially implement and/or operate a computer vision pipeline that processes image data, such as image data captured by a front camera system of an autonomous vehicle.

In embodiment illustrated in FIG. 1, the system 100 includes a simulation system 114 that may be instructed to simulate performance, by the processing system 102, of the same diagnostic operation(s) identified in the instruction 110A. The simulation system 114 simulates performance of the diagnostic operation(s) to generate expected or predetermined error detection values (referred to as "golden references" 116). The processing system 102 and the simulation system 114 may be instructed separately and/or at different times to perform the diagnostic operation(s). In at least one embodiment, the simulation system 114 performs the diagnostic operation(s) before the diagnostic operation(s) are performed by the processing system 102. Thus, the golden references may be characterized as being predetermined with respect to performance of the diagnostic operation(s) by the processing system 102.

The simulation system 114 may implement a simulated process 122 that simulates the processing system 102 and an error detection process 120. The simulated process 122 may generate simulation output 118 and the error detection process 120 may determine the golden references 116 based at least in part on the simulation output 118. The simulated process 122 may be executed offline with respect to the processing system 102. Thus, the simulated process 122 may simulate performance of the diagnostic operation(s), generate the simulation output 118 (e.g., based at least in part on the predetermined input 112), and determine the golden references 116 (e.g., using the error detection process 120) based at least in part on the simulation output 118. The simulation system 114 may be implemented by processor executable instructions stored on a non-transitory processor-readable medium and executed by at least one processor of a computing system.

As mentioned above, the processing system 102 may perform one or more diagnostic operations in accordance with the instruction 110A, and/or one or more functional operations in accordance with the instruction 110B. The processing system 102 includes one or more processing blocks 124 that each implements one or more processes 126 that each generates output by performing at least a portion of the diagnostic operation(s) and/or at least a portion of the functional operation(s). For example, the process(es) 126 of the processing block(s) 124 may each generate actual output 128 by performing at least a portion of one or more of the diagnostic operation(s) identified in the instruction 110A. The process(es) 126 each provides its actual output 128 to an error detection process 130 that determines one or more actual error detection values 132 based at least in part on the actual output 128. The error detection process 130 provides the error detection value(s) 132 to a comparison process 134 that obtains a comparison result 136 by comparing one of the golden references 116 to each of the error detection value(s) 132. The processing system 102 evaluates the comparison result 136 and determines whether any faults have occurred. If the processing system 102 determines that a fault has occurred, the processing system 102 may generate a fault notification 138 and send the fault notification 138 to the safety monitor 106. The safety monitor 106 and/or the system controller 104 may take one or more corrective actions after receiving the fault notification 138.

By way of another example, the process(es) 126 of the processing block(s) 124 may each generate functional output (not shown) by performing at least a portion of one or more of the functional operation(s) identified in the instruction 110B. However, the processing system 102 may not determine whether any faults have occurred when the processing system 102 performs the functional operation(s) in accordance with the instruction 110B. Thus, the processing system 102 may disable the error detection process 130 when the processing system 102 performs the functional operation(s). In such embodiments, the error detection process 130 may not determine any error detection values for the functional output and the comparison process 134 is not used to obtain a comparison result. Thus, the processing system 102 may not determine whether any faults have occurred.

The predetermined input 112 optionally supplied to the processing system 102 along with the instruction 110A to perform the diagnostic operation(s) may be stored in a memory subsystem 140. The memory subsystem 140 may include volatile memory (e.g., dynamic random-access memory ("DRAM")) and/or nonvolatile memory. By way of a non-limiting example, the processing system 102 may be implemented as an integrated circuit that optionally includes the system controller 104 and the memory subsystem 140. The integrated circuit may be implemented on one or more silicon substrates (e.g., silicon chips). For example, the processing system 102, the system controller 104, and the memory subsystem 140 may be components of a system on a chip ("SoC") 150. The SoC 150 may be installed in a target device or system, such as an autonomous vehicle, an electrical device (e.g., a laptop, a tablet, a cellular telephone, a smartphone, etc.), a robotic device, and the like.

One or more of the processing block(s) 124 may perform different types of operations and/or implement different processes than at least one other of the processing block(s) 124. The processing block(s) 124 may be homogeneous or heterogeneous. In the embodiment illustrated, the processing block(s) 124 is/are implemented in different hardware regions of the SoC 150. However, in at least one embodiment, one or more of the processing block(s) 124 may share hardware components. By way of another non-limiting example, one or more of the processing block(s) 124 may be implemented as a portion of a separate SoC.

Figure 2:
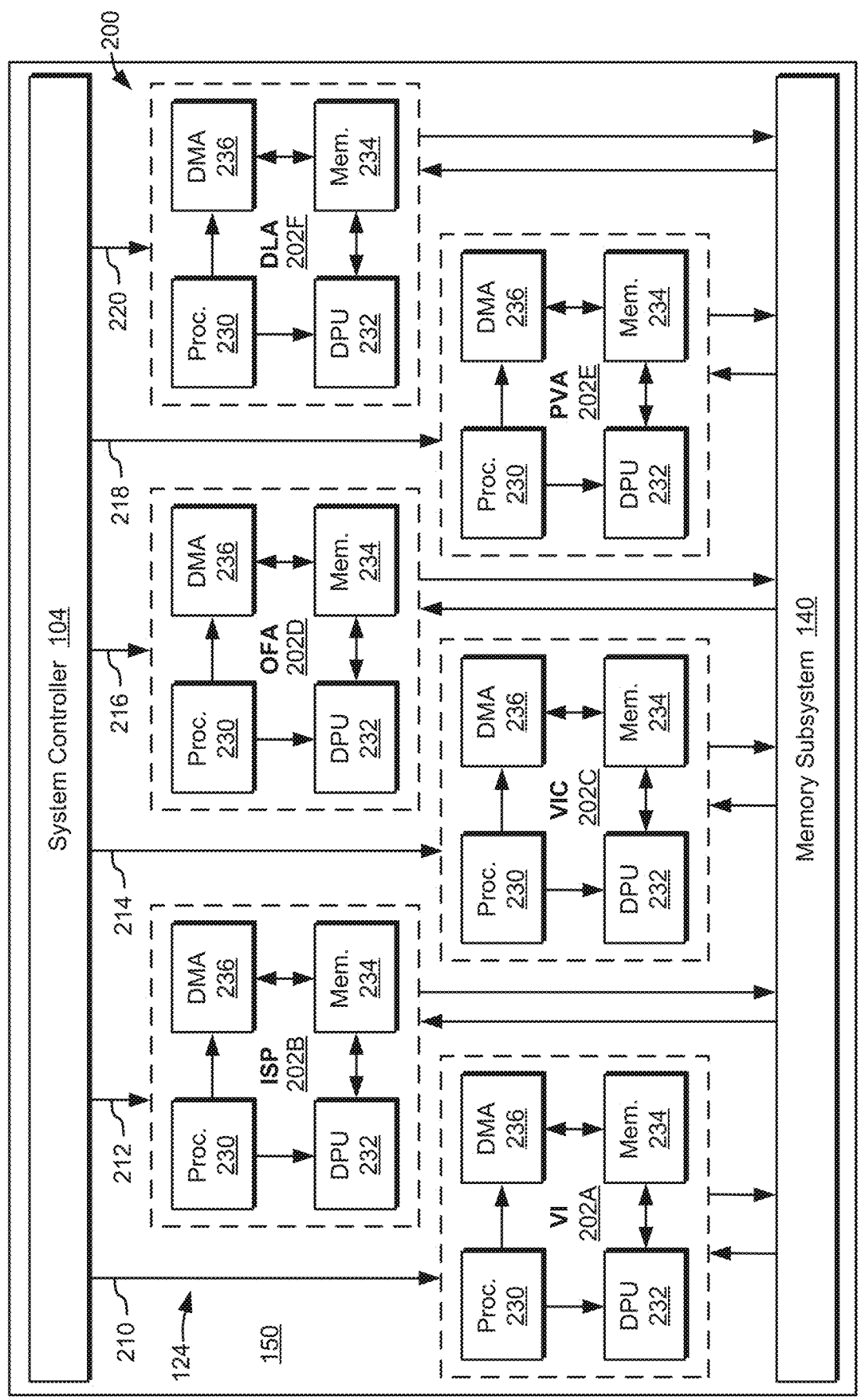
FIG. 2 is an illustration of a block diagram of an example processing pipeline implemented by processing block(s) of the processing system, in accordance with some embodiments of the present disclosure.

FIG. 2 is an illustration of a block diagram of an example processing pipeline 200 implemented by the processing block(s) 124 of the processing system 102 (see FIG. 1), in accordance with some embodiments of the present disclosure. In the embodiment illustrated in FIG. 2, the processing block(s) 124 may include processing blocks 202A-202F that have been illustrated as implementing a computer vision pipeline (e.g., for an autonomous vehicle). In such implementations, the processing blocks 202A-202F may implement a video input ("VI") block, an Image Sensor Processor ("ISP") block, a Video Image Compositor ("VIC") block, an Optical Flow Accelerator ("OFA") block, a Programmable Vision Accelerator ("PVA") block, and a Deep Learning Accelerator ("DLA") block, respectively. In alternate embodiments, the processing block(s) 124 may implement other types of processing pipelines used by or incorporated into autonomous vehicles and/or other types of devices. By way of a non-limiting example, one or more of the processing block(s) 124 may be implemented as a hardware accelerator.

The instruction(s) 110 (see FIG. 1) has/have been illustrated in FIG. 2 as including commands 210-220. As shown in FIG. 2, an output of one of the processing block(s) 124 may be input to another one of the processing block(s) 124. For example, in FIG. 2, the system controller 104 sends the command 210 to the processing block 202A to process input data (e.g., the predetermined input 112 illustrated in FIG. 1) stored in the memory subsystem 140. The processing block 202A obtains the input data, processes it, and stores output data (e.g., the actual output 128 illustrated in FIG. 1) in the memory subsystem 140. The processing block 202A may also notify the system controller 104 that the processing block 202A has finished processing its input data and stored the output data in the memory subsystem 140. Then, the system controller 104 sends the command 212 to the processing block 202B to process, as input data, the output data stored by the processing block 202A. The processing block 202B obtains the input data, processes it, and stores new output data in the memory subsystem 140. The processing block 202B may also notify the system controller 104 that the processing block 202B has finished processing its input data and stored the new output data in the memory subsystem 140. This process repeats with the system controller 104 sending the commands 214-220 to the processing blocks 202C-202F, respectively. which each obtains its respective input data, processes it, stores new output data in the memory subsystem 140, and optionally notifies the system controller 104 that the new output data has been stored in the memory subsystem 140.

Each of the processing block(s) 124 includes a local processor block 230, a data processing unit ("DPU") 232, local memory 234, and a direct memory access ("DMA") block 236. The local processor block 230 interprets commands received from the system controller 104 (see FIGS. 1-3, 5, 8, and 9), and manages other blocks (e.g., the DPU 232, the DMA block 236, the local memory 234, and the like) within its processing block to perform operations specified by those commands. The local processor block 230 may be implemented as a main central processing unit ("CPU") complex, one or more microprocessors, one or more microcontrollers, one or more graphics processing units ("GPUs"), one or more data processing units ("DPUs"), and the like. The local memory 234 may include volatile memory (e.g., DRAM, Static Random-Access Memory ("SRAM"), and the like) and/or nonvolatile memory. The DPU 232 and/or the DMA block 236 may be implemented as one or more circuits.

The processing blocks 202A-202F each performs one or more sub-operations when the processing system 102 is performing the diagnostic operation(s) and/or the functional operation(s) identified in the instruction(s) 110 (see FIG. 1). For example, the DPU 232 of each of the processing blocks 202A-202F (see FIG. 2) may perform a process (e.g., at least a portion of a functional operation) that is specific to the application 108 (see FIGS. 1, 8, and 9) when the instruction(s) 110 include the instruction 110B (see FIG. 1). The DPU 232 of each of the processing blocks 202A-202F (see FIG. 2) may perform the same process (e.g., with respect to the predetermined input 112 illustrated in FIG. 1) when the instruction(s) 110 include the instruction 110A (see FIG. 1).

Figure 3:
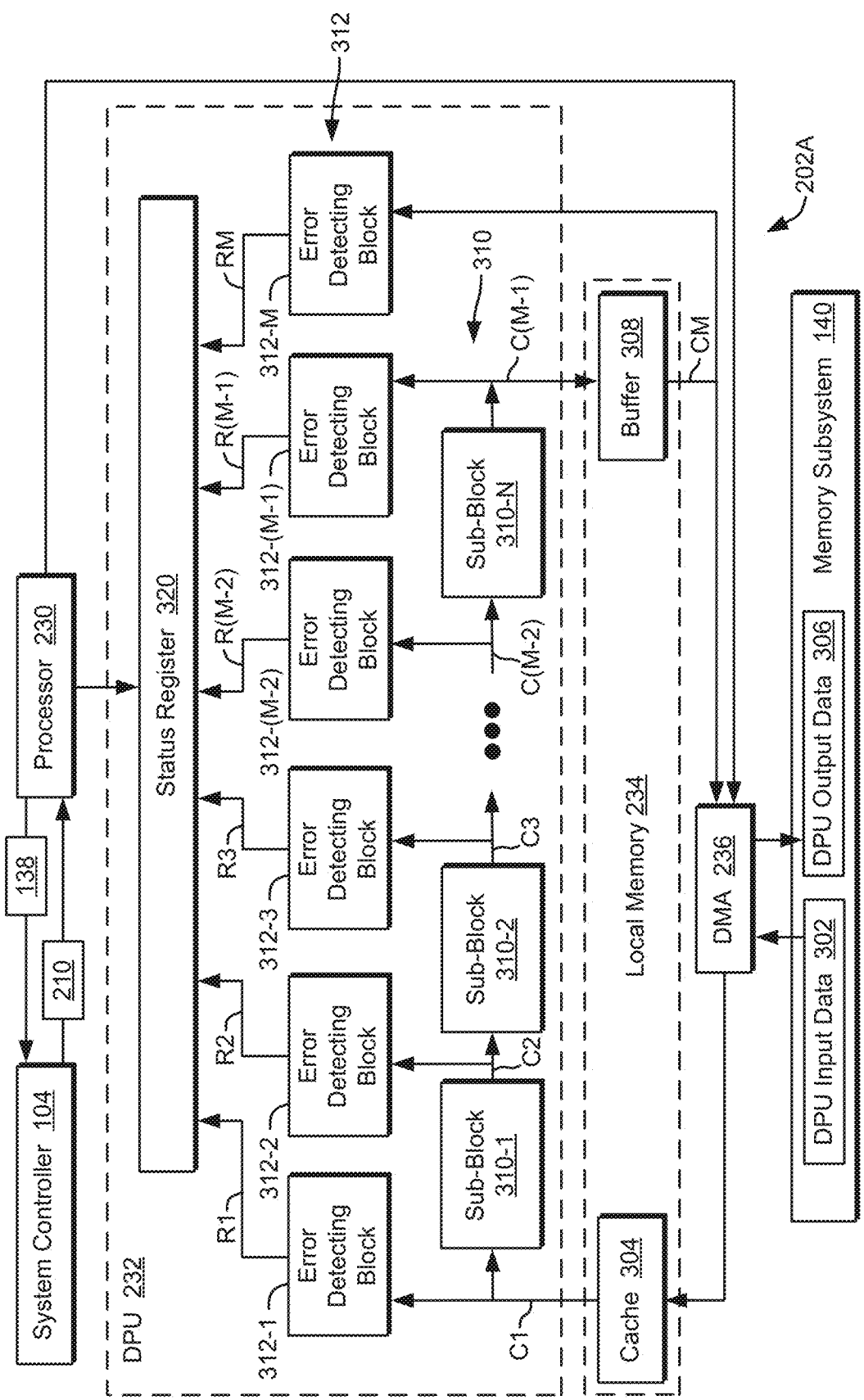
FIG. 3 is an illustration of a block diagram of example components that may be included in each the processing block(s), in accordance with some embodiments of the present disclosure.

FIG. 3 is an illustration of a block diagram of example components that may be included in each the processing blocks 202A-202F (see FIG. 2), in accordance with some embodiments of the present disclosure. For ease of illustration, FIG. 3 will be described as illustrating the components of the processing block 202A. However, each of the processing block(s) 124 may include substantially identical components to those illustrated in FIG. 3.

Referring to FIG. 3, the local processor block 230 may receive the command 210 from the system controller 104. In this example, the command 210 directs the processing block 202A to perform at least a portion of a diagnostic operation, which requires that the processing block 202A process DPU input data 302 (e.g., the predetermined input 112 illustrated in FIG. 1) stored in the memory subsystem 140. In response to the command 210, the local processor block 230 may instruct the DMA block 236 to fetch the DPU input data 302 from the memory subsystem 140 and store the DPU input data 302 in a cache 304 in the local memory 234. The DPU 232 processes the DPU input data 302 and produces DPU output data 306, which the DPU 232 stores in a buffer 308 in the local memory 234. The local processor block 230 may instruct the DMA block 236 to obtain the DPU output data 306 from the buffer 308 and store the DPU output data 306 in the memory subsystem 140. Optionally, the local processor block 230 may inform the system controller 104 that the processing block 202A has finished processing the DPU input data 302 and has stored the DPU output data 306 in the memory subsystem 140. The cache 304 and/or the buffer 308 may help reduce latency associated with accessing the memory subsystem 140.

At this point, the system controller 104 may send the command 212 (see FIG. 2) to the processing block 202B (see FIG. 2), which may cause the local processor block 230 of the processing block 202B to instruct the DMA block 236 of the processing block 202B to fetch the DPU output data 306 from the memory subsystem 140 and store the DPU output data 306 in the cache 304 in the local memory 234 of the processing block 202B as the DPU input data 302 for the processing block 202B. The DPU 232 of the processing block 202B processes the DPU input data 302 and produces new DPU output data 306, which the DPU 232 of the processing block 202B stores in the buffer 308 in the local memory 234 of processing block 202B. The local processor block 230 of the processing block 202B may instruct the DMA block 236 of the processing block 202B to obtain the DPU output data 306 from the buffer 308 of the processing block 202B and store the DPU output data 306 in the memory subsystem 140. Optionally, the local processor block 230 of the processing block 202B may inform the system controller 104 that the processing block 202B has finished processing its DPU input data 302 and has stored the new DPU output data 306 in the memory subsystem 140. At this point, the system controller 104 may send the command 214 (see FIG. 2) to the processing block 202C (see FIG. 2) and so forth until the processing block 202F (see FIG. 2) has finished processing its DPU input data 302 and has stored its DPU output data 306 in the memory subsystem 140. In other words, this process continues until all of the processing blocks 202A-202F have processed their respective DPU input data 302.

While processing their respective DPU input data, the hardware of the DPU 232 of one or more of the processing blocks 202A-202F and/or hardware connected to the DPU(s) may potentially experience one or more hardware faults. Functional safety operations may be used to reduce risk of harm potentially caused by such faults to a tolerable or acceptable level.

Such functional safety operations may include operations for detecting transient hardware faults and/or permanent hardware faults. For example, transient hardware faults may be detected by using error detection code ("EDC") circuitry to generate EDCs (e.g., check bits, error correction codes ("ECC"), and the like). By way of a non-limiting example, if an operation being performed is a write request to store data in SRAM, a generator block within the EDC circuitry that is positioned to receive the write request will generate one or more check bits based at least in part on the data. The EDC circuitry may forward the check bit(s) and the write request to the SRAM, which stores the check bit(s) along with the data. When the SRAM receives a read request for the data, the SRAM retrieves the check bit(s) and the data and sends both of them to a terminator block within the EDC circuitry. The terminator block uses the check bit(s) to determine whether any bits of the data have been corrupted. Optionally, the terminator block may correct the corrupted bit(s), if any are present in the data. For example, the EDC circuitry may implement Memory Parity, Memory Error Correction Codes ("ECC") (also referred to as ECC Memory), and the like.

Permanent hardware faults may be detected using software diagnostic methods, such as an In-System Test ("IST") method and/or a Permanent Fault Software Diagnostic ("PFSD") method. Unlike the EDC circuitry, which detects transient hardware faults by processing functional data flowing through a target system, the software diagnostic methods cause the target system to perform diagnostic operations (e.g., a processing test, processing diagnostic data, and the like). Thus, the software diagnostic methods may be characterized as exercising hardware present in the target system.

The PFSD method issues PFSD tasks that may be interspersed with functional operations (e.g., originating from the application 108). For example, the PFSD tasks may be scheduled to be performed occasionally (e.g., periodically) within a Fault Tolerant Time Interval ("FTTI"). The FTTI is an amount of time that a fault can be present in the target system before an undesirable event (e.g., a hazard) occurs.

A PFSD task may exercise the hardware of the target system by using the hardware in the same manner that a functional operation uses the hardware. For example, the same hardware interface may be used by both the PFSD task and the functional operations for configuration access and/or data access. Similarly, the same programming sequence may be followed by software executing on the target system when performing both PFSD tasks and functional operations. In other words, the PFSD method uses existing hardware and software components of the target system, which may make the PFSD method easy to deploy. Further, the PFSD method does not require additional context switching because the hardware processes a PFSD task in the same manner as a functional operation.

A percentage of hardware that may be tested by a diagnostic method is referred to as its diagnostic coverage. Diagnostic coverage achievable by the PFSD method may be determined at least in part by a predetermined number of PFSD tasks (implemented as software diagnostic tasks) available. A hardware processing block (e.g., one of the processing block(s) 124) may be characterized as including a control and configuration block, a communication block, and data processing blocks. The control and configuration block may include a processor (e.g., the local processor block 230), which is too versatile to be comprehensively exercised by the predetermined number of PFSD tasks. Thus, the effectiveness of the PFSD method with regard to the control and configuration block may be relatively low. For example, injecting simulated permanent hardware faults into the control and configuration block of a target system has shown that the PFSD method may provide a diagnostic coverage of about 10% to about 20% of the control and configuration block in the target system. Unfortunately, increasing the number of predetermined software diagnostic tasks to increase the diagnostic coverage, may increase runtime and tie up the hardware.

The communication block may include logic for dealing with special conditions that are difficult, if not impossible, to test using PFSD tasks because a large number of PFSD tasks would be required to test a large number of logical combinations, some of which may not even be viable and, therefore, do not need to be tested. Injecting simulated permanent hardware faults into the communication block of a target system has shown that the PFSD method may provide a diagnostic coverage of about 40% to about 50% of the communication block in the target system. While it may be possible to attain a moderately acceptable level of diagnostic coverage of the communication block, increasing that diagnostic coverage may be difficult.

The data processing blocks may perform fixed functions in accordance with a work mode determined by a particular application (e.g., the application 108). Moreover, the work modes supported by the data processing blocks may be limited, and only a subset of available work modes (e.g., used by the application 108) may be of interest to the PFSD method. Therefore, a reasonable number of PFSD tasks that do not tie up the hardware of the target system may be sufficient to adequately exercise the data processing blocks. Thus, the effectiveness of the PFSD method with regard to the data processing blocks may be relatively high. For example, injecting simulated permanent hardware faults into the data processing blocks of a target system has shown that the PFSD method may provide a diagnostic coverage of about 60% to about 80% of the data processing blocks in the target system.

Referring to FIG. 2, as mentioned above, the predetermined number of PFSD tasks may be selected that adequately exercise the data processing blocks without consuming an undesirable amount of processing resources (e.g., increasing runtime and/or tying up hardware). The data processing blocks may include the DPU 232 of each of the processing block(s) 124, which may perform one or more functional processes that is/are specific to the application 108 (see FIGS. 1, 8, and 9). In other words, the data processing blocks of the processing block(s) 124 may perform fixed functions in accordance with a work mode determined by the application 108. For example, a DLA engine (e.g., implemented by the DPU 232 of the processing block 202F) may perform convolutional neural network ("CNN") operations. By way of another non-limiting example, a VIC engine (e.g., implemented by the DPU 232 of the processing block 202C) may perform pixel interpolation or extrapolation after scaling factors have been specified.

Unfortunately, it may be possible for some hardware faults to occur but go undetected by PFSD tasks. Whether a fault is detectable is referred to as its fault effect observability. PFSD tasks are designed to generate actual results that are compared to predetermined results. Only those faults that cause a mismatch between the actual results and the predetermined results are detected by the PFSD method. In other words, faults that do not cause a mismatch may remain undetected or latent.

A location where a fault occurs may be referred to as a fault point and a location at which an actual result is collected to be compared to a predetermined result is referred as a diagnostic point. The observability of a fault depends upon the placement of diagnostic points within the target system. Typical diagnostic points include a primary output of a hardware engine (e.g., one of the processing block(s) 124), and may include one or more register bits that indicate only gross healthiness of the hardware engine. While increasing the number of diagnostic points may increase diagnostic coverage, doing so may also increase runtime and tie up the hardware. Additionally, conventional implementations of the PFSD method are performed by software, which requires processor time. For example, software is used to obtain one or more values by processing the actual results (e.g., calculate one or more checksums based on the actual results) and/or compare the value(s) to the predetermined results. Thus, temporal and spatial costs of such software implementations of the PFSD method may not be negligible. This may be particularly true when the target system implements a CV pipeline because of an amount of pixel data in video frames processed by the hardware engines (e.g., processing blocks like the processing blocks 202A-202F), even when a checksum algorithm like Cyclic Redundancy Check ("CRC") is used.

The fault point may be connected to other hardware. Thus, the effect of a fault may propagate through connected hardware (also referred to as intermediate system logic) from the fault point to a diagnostic point, at which point the fault may be observable by the PFSD method. The complexity of hardware design makes fault propagate through connected hardware a difficult problem that may be explored using two conceptual metrics: structural observability and workload observability.

Figure 4:
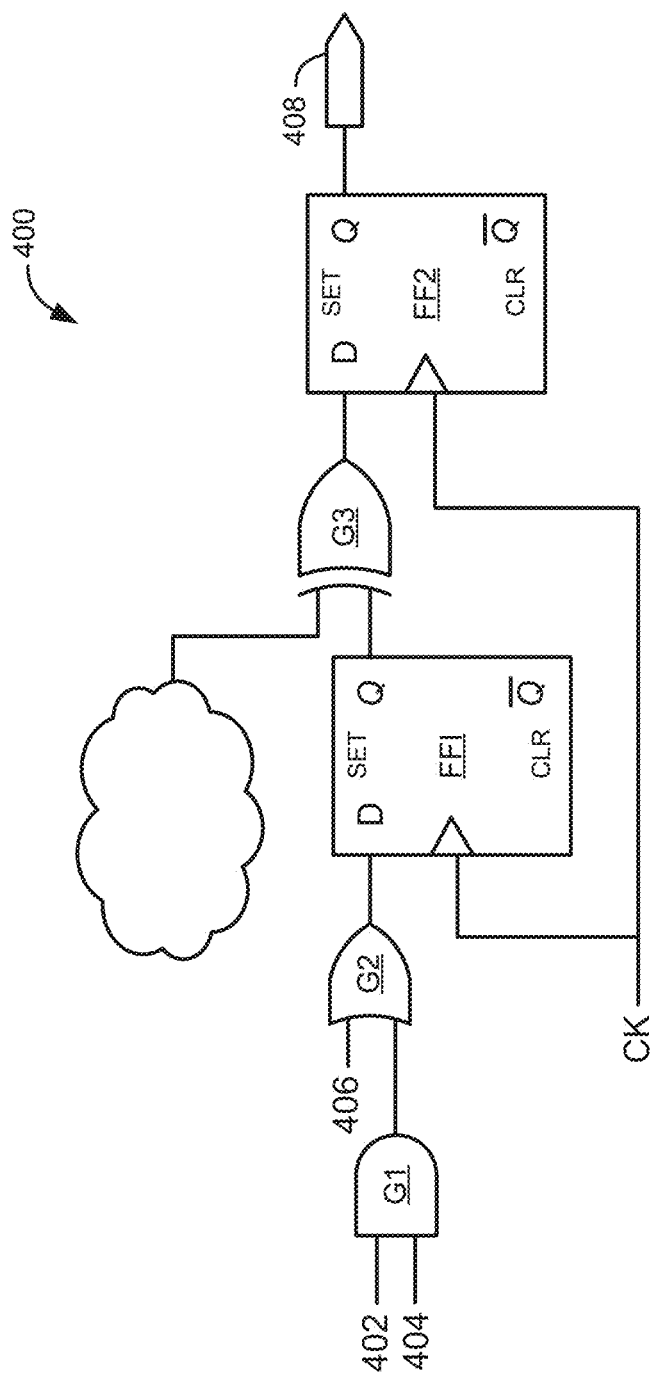
FIG. 4 is an illustration of a circuit diagram of an example circuit used to illustrate when a fault is structurally and/or workload observable, in accordance with some embodiments of the present disclosure.

Structural observability determines whether a path exists in the target system from the fault point to a diagnostic point and does not take logic state into account. For example, a stuck-at fault is considered structurally observable when the effect of the stuck-at fault reaches at least one diagnostic point, or is included in a fan-in cone of any of the diagnostic points. FIG. 4 is an illustration of a circuit diagram of an example circuit 400 used to illustrate when a fault is structurally and/or workload observable, in accordance with some embodiments of the present disclosure. Referring to FIG. 4, the circuit 400 includes an AND logic gate G1, an OR logic gate G2, and an XOR logic gate G3 and two flip-flops FF1 and FF2. The AND logic gate G1 has two input ports 402 and 404 and the OR logic gate G2 has an input port 406. A fault may occur at one or more of the input ports 402-406. The flip-flop FF2 has an output port 408 that is a diagnostic point. Faults occurring at the input ports 402-406 are all structural observable because the states of the input ports 402-406 can propagate through the circuit 400 to the output port 408. However, PFSD tasks will not be able to detect all structural observable faults because the effect of some faults may be offset by static values set by a PFSD task (e.g., acting as logical clamps). For example, when the PFSD task sets the input port 404 equal to zero, the AND logic gate G1 will output zero and input received at the input port 402 will not change the output of the AND logic gate G1. Thus, any faults occurring at the input port 402 will not be detectable at the output port 408. By way of another example, when the PFSD task sets the input port 406 equal to one, the OR logic gate G2 will output one and input received from the AND logic gate G1 will not change the output of the OR logic gate G2. Thus, any faults occurring at the input port 402 and/or the input port 404 will not be detectable at the output port 408.

As the previous example illustrates, the detectability of a structural observable fault may depend upon the workload, which is determined by the PFSD tasks. A fault that can propagate through a diagnostic point under a specific workload is denoted as being workload observable. Whether a workload observable fault is actually detected by the PFSD tasks depends upon the design of the PFSD tasks. Thus, fault effect observability may be improved in two ways. First, additional diagnostic points may be added to the target system. For example, such additional diagnostic points may include all values used by a safety application to prevent a fault from affecting the functioning of the safety application. Second, the PFSD tasks may be tailored to generate a workload that ensures structural observable faults are workload observable and detectable by a check mechanism. Such tailoring is referred to as an elaboration process. To increase diagnostic coverage, software implementing the PFSD method may elaborate or enhance workload generated by the PFSD tasks to increase fault effect observability. But, the elaborated workload may encounter some bottlenecks and may have an increased runtime.

Referring to FIG. 3, the DPU 232 may avoid such bottlenecks and/or increased runtime by using hardware to increase the number of diagnostic points, determine error detection values (e.g., by performing a checksum computation), and compare the error detection values to golden references. For example, in the embodiment illustrated in FIG. 3, the DPU 232 includes channels C1-CM, sub-blocks 310, and error detecting blocks 312. The sub-blocks 310 receive and/or send information (e.g., as data packets) over channels C1-C(M-1). In the embodiment illustrated, the sub-blocks 310 include sub-blocks 310-1 to 310-N that are connected together in a series by the channels C2-C(M−2) but other arrangements, such as parallel and combined parallel and series arrangements, may be used. In the embodiment illustrated, the error detecting blocks 312 include error detecting blocks 312-1 to 312-M that are connected to the channels C1-CM, respectively. The error detecting blocks 312 may be characterized as passively monitoring data output by the sub-blocks 310-1 to 310-N and transmitted in the channels C2-C(M−1), respectively.

In the embodiment illustrated, the channels C1-C(M−2) provide sub-block input data to the sub-blocks 310-1 to 310-N, respectively, and the channels C2-C(M−1) obtain sub-block output data from the sub-blocks 310-1 to 310-N, respectively. The channel C1 connects the cache 304 to the sub-block 310-1 and the channel CM connects the buffer 308 to the DMA block 236. In the example illustrated, a number M of the channels C1-CM may be two greater than a number N of the sub-blocks 310-1 to 310-N. Each of the sub-blocks 310-1 to 310-N performs one or more sub-operations on the sub-block input data that is conducted to the sub-block by one of the channels C1-C(M−2) and produces the sub-block output data that is conducted away from the sub-block by one of the channels C2-C(M−1). Thus, in the example illustrated, the sub-block output data of one of the sub-blocks 310-1 to 310-N is the sub-block input data of another one of the sub-blocks 310-1 to 310-N.

In the example illustrated, the channel C1 inputs the DPU input data 302 into the sub-block 310-1 and the error detecting block 312-1. The sub-blocks 310-1 to 310-N are connected together in a series with the sub-block 310-1 receiving the DPU input data 302 (as its sub-block input data), processing its sub-block input data, and supplying its sub-block output data to both the sub-block 310-2 and the error detecting block 312-2 over the channel C2. As mentioned above, each of the sub-blocks 310-2 to 310-(N−1) receives the sub-block output data from a predecessor one of the sub-blocks 310-1 to 310-(N−2) as its sub-block input data, processes its sub-block input data, and supplies its sub-block output data to a successor one of the sub-blocks 310-3 to 310-N and one of the error detecting block 312-3 to 312-(M−2). The sub-block 310-N receives (as its sub-block input data) the sub-block output data from the sub-block 310-(N−1), processes its sub-block input data, and supplies its sub-block output data to both the buffer 308 and the error detecting block 312-(M−1) over the channel C(M−1). The channel CM supplies the output of the buffer 308 to the DMA block 236 and the error detecting block 312-M.

Each of the error detecting blocks 312-1 to 312-M generates an error detection value (e.g., a checksum) based at least in part on its input and determines whether that error detection value matches a golden reference. In the example illustrated, the error detecting blocks 312-1 to 312-M generate comparison results R1-RM, respectively, and store the comparison results R1-RM in a status register 320 (e.g., a rolling register). The local processor block 230 is connected to the status register 320 and obtains the comparison results R1-RM therefrom. The local processor block 230 may forward one or more of the comparison results R1-RM, as the fault notification 138, to the system controller 104. For example, if one of the comparison results R1-RM indicates a fault has occurred, the local processor block 230 may forward the fault notification 138 to the system controller 104.

In the embodiment illustrated, the channels C1-CM each function as a diagnostic point and the inclusion of the error detecting blocks 312-1 to 312-M increases the number of diagnostic points in the DPU 232 (e.g., by at least the number N). In addition to increasing the number of diagnostic points inside the DPU 232, the error detecting blocks 312-2 to 312-(M−1) include hardware that determines the error detection values (e.g., by performing a checksum computation), and hardware that compares the error detection values to golden references. Thus, the determination of the error detection values and their comparison to the golden references does not tie up the local processor block 230.

Figure 5:
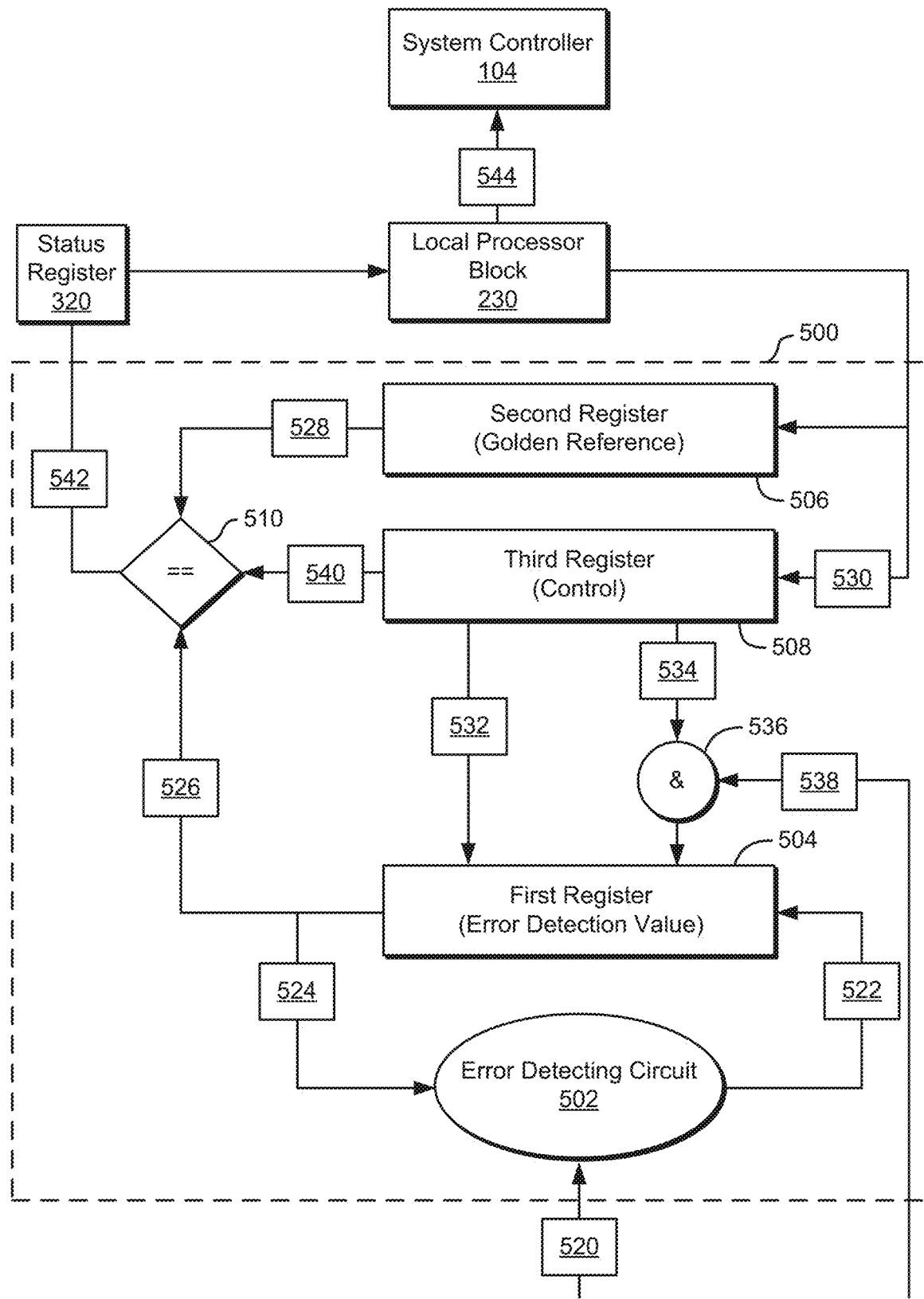
FIG. 5 is an illustration of a circuit diagram of an example circuit that may be used to implement error detecting blocks, in accordance with some embodiments of the present disclosure.

FIG. 5 is an illustration of a circuit diagram of an example circuit 500 that may be used to implement one or more of the error detecting blocks 312 (see FIG. 3), in accordance with some embodiments of the present disclosure. Referring to FIG. 5, the circuit 500 may include an error detecting circuit 502 (e.g., an EDC circuit), three registers 504-508, and comparison circuitry 510. One or more of the registers 504-508 may be implemented as a software programmable register.

The error detecting circuit 502 may receive input 520 from, referring to FIG. 3, the cache 304, the buffer 308, or one of the sub-blocks 310-3 to 310-(N). Referring to FIG. 5, the error detecting circuit 502 determines an error detection value 522 based at least in part on the input 520 and transmits the error detection value 522 to the first register 504, which stores the error detection value 522. By way of a non-limiting example, the error detection value 522 may be a CRC code determined by the error detecting circuit 502. In at least one embodiment, the error detection value 522 may be determined based on the input 520, and a previous error detection value 524 received from the first register 504. Some error detection methods may include additional values, such as a predetermined polynomial. For example, if the input 520 is received as a series of data packets, the error detecting circuit 502 may determine a first CRC code for the first data packet in the series, a predetermined polynomial, and a value stored in the first register 504, which may be an initialized value (e.g., zero). The error detecting circuit 502 may store the first CRC code in the first register 504. Then, the error detecting circuit 502 may determine a second CRC code for the second data packet in the series, the predetermined polynomial, and the value stored in the first register 504, which was determined for the first packet. This process continues for each data packet in the series until all have been processed by the error detecting circuit 502 at which point the first register 504 stores a final error detection value 526.

The second register 506 receives and stores a golden reference 528 (e.g., one of the golden references 116 illustrated in FIG. 1). In the embodiment illustrated, the second register 506 may receive the golden reference 528 from the local processor block 230. The local processor block 230 may have received the golden reference 528 from the system controller 104 (e.g., in the instruction 110A illustrated in FIG. 1).

The third (control) register 508 may help manage the circuit 500, which may include initializing the first register 504, enabling computation of the final error detection value 526, disabling computation of the final error detection value 526, and/or triggering the comparison circuitry 510 to compare values stored by the first and second registers 504 and 506. For example, the third (control) register 508 may receive one or more commands 530 from the local processor block 230. The command(s) 530 may cause the third (control) register 508 to store a value 532 that causes the first register 504 to initialize (e.g., set its value equal to zero).

The command(s) 530 may cause the third (control) register 508 to store a value 534 that enables the error detecting circuit 502 to determine the final error detection value 526. In the example illustrated in FIG. 5, the circuit 500 may include an AND logic gate 536 that receives the value 534 and a value 538 and outputs a predetermined high value (e.g., one) when neither of the values 534 and 538 is a low value (e.g., zero). The value 538 has a predetermined high value (e.g., one) when the input 520 (e.g., a new data packet)

is ready to process. In other words, the value 538 has the predetermined high value when the input 520 is valid. The AND logic gate 536 may receive the value 538 from any structure that provides data to a particular one of the error detecting blocks 312 that includes the AND logic gate 536, such as the cache 304 (see FIG. 3), the buffer 308 (see FIG. 3), or any of the sub-blocks 310 (see FIGS. 3, 8, and 9). In other words, the value 538 may be received from any of channels C1 to CM (see FIG. 3). When the AND logic gate 536 outputs the predetermined high value (e.g., one), the first register 504 provides the predetermined high value to the error detecting circuit 502 (e.g., along with the previous error detection value 524), which enables the error detecting circuit 502. The AND logic gate 536 outputs a predetermined low value (e.g., zero) when at least one of the values 534 and 538 is the low value (e.g., zero). By way of a non-limiting example, the error detecting circuit 502 may obtain the value output by the AND logic gate 536 by polling the first register 504 for the value.

The command(s) 530 may cause the third (control) register 508 to store a value (not shown) that disables the error detecting circuit 502 so that the error detecting circuit 502 does not determine the final error detection value 526. In the example illustrated in FIG. 5, the value (not shown) may be low (e.g., zero) so that the AND logic gate 536 outputs a predetermined low value (e.g., zero) that the error detecting circuit 502 receives (e.g., along with the previous error detection value 524) and that disables the error detecting circuit 502.

The command(s) 530 may cause the third (control) register 508 to store a value 540 that causes the comparison circuitry 510 to compare the final error detection value 526 and the golden reference 528 stored by the first and second registers 504 and 506, respectively, and output a result 542 of that comparison (e.g., one of the comparison results R1-RM illustrated in FIG. 3) to the status register 320. By way of a non-limiting example, the comparison circuitry 510 may poll the third (control) register 508 for the value 540. In the embodiment illustrated, the local processor block 230 may obtain the result 542 from the status register 320, which may function as a dedicated port. Thus, the third (control) register 508 may manage the circuit 500 by initializing the first register 504, enabling computation of the error detection value 522, disabling computation of the error detection value 522, and triggering the comparison by the comparison circuitry 510.

Referring to FIG. 3, as mentioned above, the error detecting blocks 312-1 to 312-M provide the comparison results R1-RM, respectively, to the local processor block 230 (e.g., via the status register 320). If one or more of the comparison results R1-RM indicates a fault has occurred, the local processor block 230 may inform the system controller 104 so corrective action can be taken. For example, referring to FIG. 5, the local processor block 230 may inform the system controller 104 by sending a fault notification 544 (e.g., in the fault notification 138 illustrated in FIGS. 1 and 3) to the system controller 104.

As mentioned above, the error detecting blocks 312 may be implemented as CRC blocks and the error detection values may be implemented as CRC codes. In such embodiments, the error detecting blocks 312 may be characterized as implementing a hardware CRC assisted software diagnostic that detects permanent and/or transient faults in a target system, such as a processing pipeline.

Figure 6:
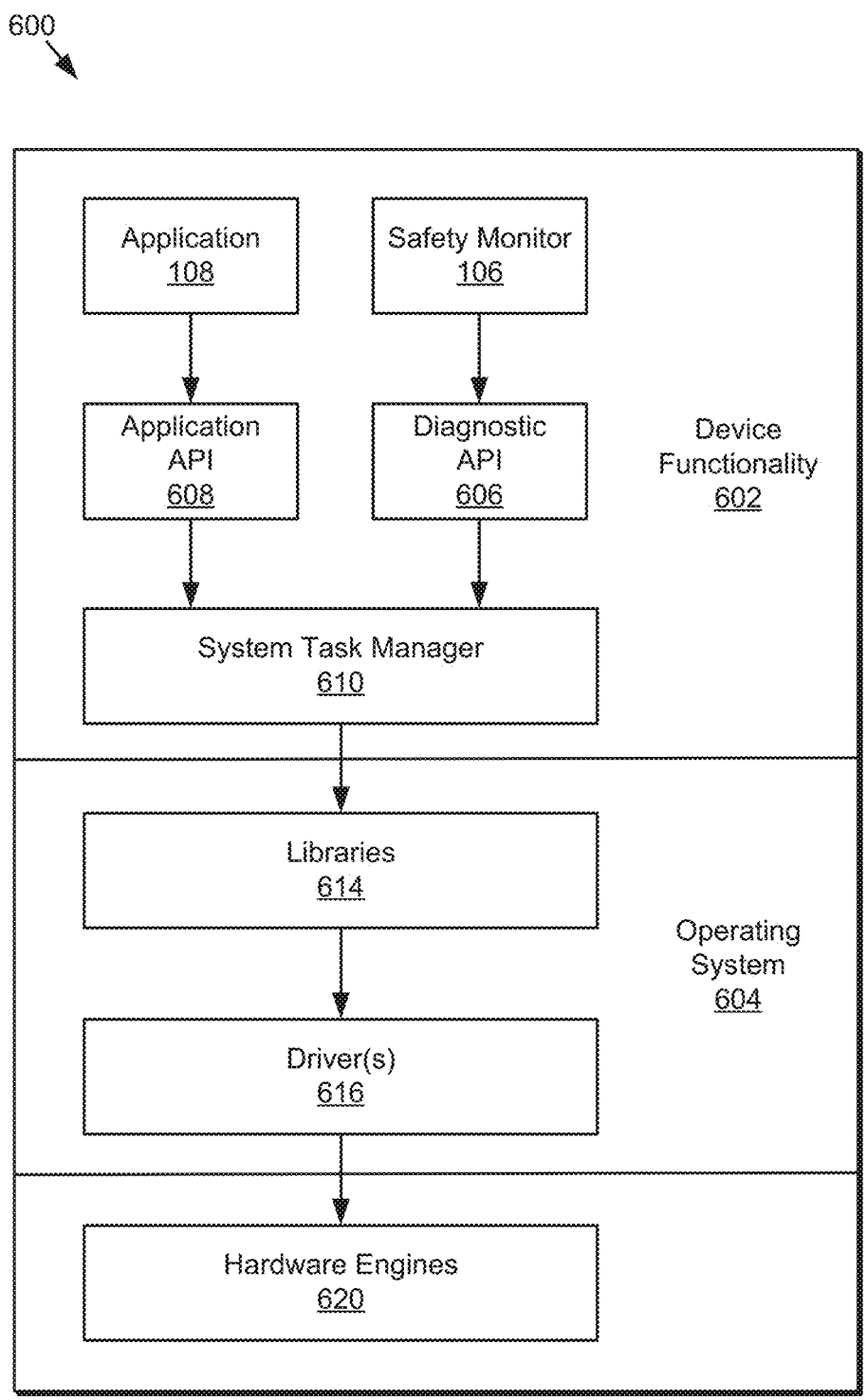
FIG. 6 is an illustration of a block diagram of example instructions that may be used to implement diagnostic and functional tasks or operations in the processing system, in accordance with some embodiments of the present disclosure.

FIG. 6 is an illustration of a block diagram of example instructions 600 that may be used to implement diagnostic and functional tasks or operations in the processing system 102 (see FIG. 1), in accordance with some embodiments of the present disclosure. For example, the instructions 600 may be stored on the SoC 150. The instructions 600 implement device functionality 602, and an operating system 604. In embodiments in which the processing system 102 is a component of an autonomous vehicle, the device functionality 602 may implement driving. The device functionality 602 includes the safety monitor 106, the application 108, a diagnostic application programing interface ("API") 606, an application API 608, and a system task manager ("STM") 610. The operating system 604 may include one or more libraries 614 and one or more drivers 616 that communicate with hardware engines 620.

Figure 8:
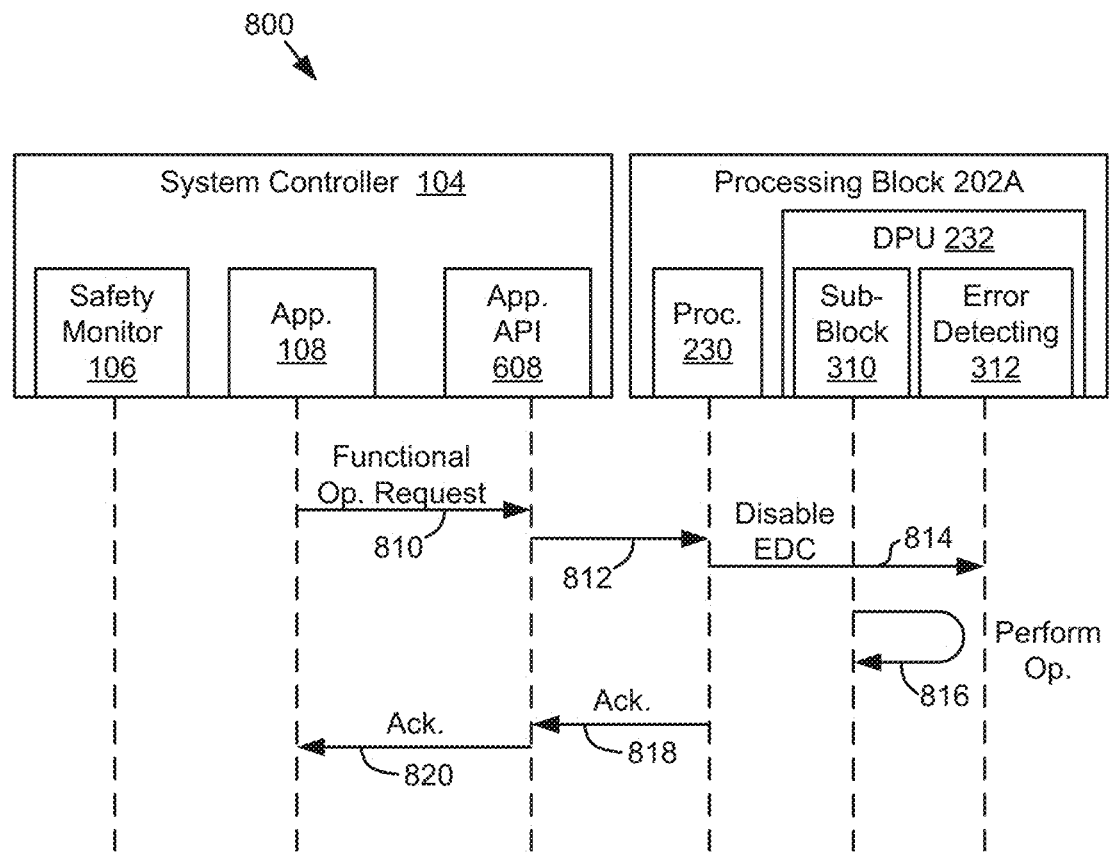
FIG. 8 is an illustration of a task coordination flowchart depicting one of the processing blocks performing a functional operation, in accordance with some embodiments of the present disclosure.

The application 108 uses the application API 608 to translate a functional request (e.g., a first command 810 illustrated in FIG. 8) into one or more functional tasks or operations (e.g., a second command 812 illustrated in FIG. 8). The safety monitor 106 uses the diagnostic API 606 to translate a safety request (e.g., a first command 902 illustrated in FIG. 9) into one or more diagnostic tasks or operations (e.g., a second command 904 illustrated in FIG. 9).

The STM 610 interleaves diagnostic operations (originating from the safety monitor 106) with the functional operations (originating from the application 108) tasks and makes the diagnostic operations indistinguishable from the functional operations to downstream software layers (e.g., the library(ies) 614 and the driver(s) 616) as well as to the hardware engines 620. The STM also manages task arbitration so that a latency target for the diagnostic operations (e.g., PFSD tasks) and a performance target for functional operations (e.g., ADAS functions) may both be accommodated. The rest of components in the architectural diagram are agnostic to an initiator of the task (e.g., the safety monitor 106 or the application 108).

The library(ies) 614 may be implemented as user library(ies) and provide communication between the STM 610 and the driver(s) 616. The driver(s) 616 may instruct the hardware engines 620 to perform specific diagnostic and/or functional operations. The hardware engines 620 may be implemented as the processing block(s) 124 (see FIGS. 1 and 2).

Figure 7:
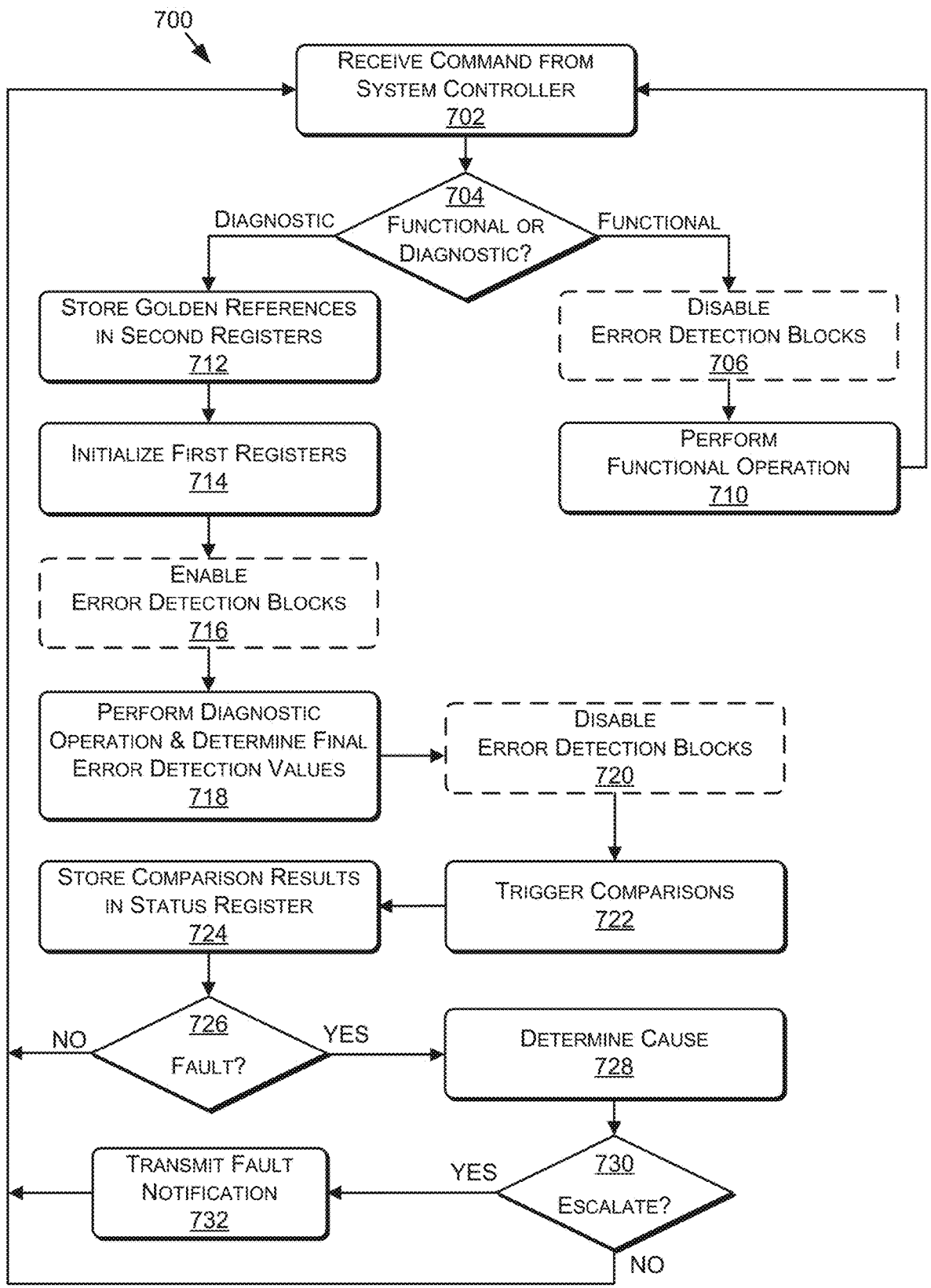
FIG. 7 is an illustration of a flow diagram showing a method of detecting faults in the processing system, in accordance with some embodiments of the present disclosure.

FIG. 7 is an illustration of a flow diagram showing a method 700 of detecting faults in the processing system 102, in accordance with some embodiments of the present disclosure. Now referring to FIG. 7, each block of the method 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the method 700 is described, by way of example, with respect to the system 100 of FIG. 1. However, these methods may additionally or alternatively be executed by any one system, or any combination of systems, including, but not limited to, those described herein.

At least portions of the method 700 may be performed by one of the processing blocks 202A-202F (see FIG. 2). For ease of illustration, a portion of the method 700 will be described as being performed by the processing block 202A but that portion may alternatively or additionally be performed by any of the processing blocks 202A-202F.

Referring to FIG. 7, in first block 702, the local processor block 230 (see FIGS. 2, 3, 5, 8, and 9) receives at least one of the instruction(s) 110 (see FIG. 1). In decision block 704, the local processor block 230 determines whether the instruction(s) direct(s) the DPU 232 (see FIGS. 2, 3, 8, and 9) to perform at least one diagnostic operation or at least one functional operation. When the instruction(s) direct(s) the DPU 232 to perform the functional operation(s), the local processor block 230 advances to optional block 706, if present, or to block 710 when optional block 706 has been omitted. On the other hand, when the instruction(s) direct(s) the DPU 232 to perform the diagnostic operation(s), the local processor block 230 advances to block 712.

In optional block 706, if the error detecting blocks 312 (see FIG. 3) are enabled, the local processor block 230 disables the error detecting blocks 312. Thus, when the DPU 232 is performing functional operations (or mission tasks), the error detecting blocks 312 are disabled. In optional block 706, the local processor block 230 may program the third (control) registers (e.g., the third register 508 illustrated in FIG. 5) to store values that disable error detecting circuits (e.g., the error detecting circuit 502 illustrated in FIG. 5). In next block 710, the DPU 232 performs the functional operation(s). Then, the local processor block 230 returns to block 702 to receive at least a new one of the instruction(s) 110 (see FIG. 1).

In block 712, the local processor block 230 stores golden references in the second registers (e.g., the second register 506) of the error detecting blocks 312 (see FIG. 3).

Then, in block 714, the local processor block 230 initializes the first registers (e.g., the first register 504) of the error detecting blocks 312 (see FIG. 3). In block 714, the local processor block 230 may program the third (control) registers (e.g., the third register 508) to store values (e.g., the value 532) that cause the first registers to initialize (e.g., store a value of zero).

Next, in optional block 716, if the error detecting blocks 312 (see FIG. 3) are disabled, the local processor block 230 enables the error detecting blocks 312. In optional block 716, the local processor block 230 may program the third (control) registers (e.g., the third register 508 illustrated in FIG. 5) to store values (e.g., the value 534) that enable error detecting circuits (e.g., the error detecting circuit 502 illustrated in FIG. 5) to determine final error detection values (e.g., the final error detection value 526).

In block 718, the DPU 232 performs the diagnostic operation(s) and the error detecting blocks 312 (see FIG. 3) determine final error detection values (e.g., the final error detection value 526). At block 718, the error detecting blocks 312-1 to 312-M (see FIG. 3) continuously sample information (e.g., data packets) transmitted over the channels C1-CM, respectively, as the diagnostic operation(s) is/are performed, determine error detection values for the information transmitted (e.g., for each data packet transferred), and update the values of the first registers after each error detection value is determined. The values of the first registers may change with each data packet conducted over the channels C1-CM. After completion of the diagnostic operation(s), each of the first registers will store final error detection values for information (e.g., for all data packets) conducted by a respective one of the channels C1-CM during performance of the diagnostic operation(s).

In optional block 720, the local processor block 230 may disable the error detecting blocks 312 (see FIG. 3). In optional block 720, the local processor block 230 may perform the same method(s) used in optional block 706 to disable the error detecting blocks 312. In embodiments that omit the optional block 720, the local processor block 230 may perform block 722 after block 718 has been completed.

In block 722, the local processor block 230 generates comparison results (e.g., the comparison results R1-RM) by causing comparison circuitry (e.g., the comparison circuitry 510 illustrated in FIG. 5) in the error detecting blocks 312 (see FIG. 3) to compare the golden references (e.g., stored in the second register 506 illustrated in FIG. 5) with the final error detection values (e.g., stored in the first register 504 illustrated in FIG. 5). In block 722, the local processor block 230 may program the third (control) registers to store values (e.g., the value 540 illustrated in FIG. 5) that cause the comparison circuitry (e.g., the comparison circuitry 510) to compare the final error detection values (e.g., the final error detection value 526) stored by the first registers to the golden references (e.g., the golden reference 528) stored by the second registers and output the comparison results (e.g., the comparison results R1-RM).

In block 724, the error detecting blocks 312 (see FIG. 3) store the comparison results (e.g., the comparison results R1-RM illustrated in FIG. 3) in a status register (e.g., the status register 320 illustrated in FIG. 3). The comparison results may be transmitted (e.g., over dedicated wire) to the status register.

Next, in decision block 726, the local processor block 230 checks the status register (e.g., the status register 320) and determines whether any of the comparison results stored in the status register indicate a fault has occurred. Thus, in decision block 726, the local processor block 230 determines whether the contents of the status register indicate a fault has occurred. The decision in decision block 726 is "YES," when the local processor block 230 determines at least one of the comparison results indicates a fault has occurred. Otherwise, the decision in decision block 726 is "NO" and the local processor block 230 returns to block 702 to receive at least a new one of the instruction(s) 110 (see FIG. 1).

When the decision in decision block 726 is "YES," in block 728, the local processor block 230 attempts to determine a cause of the fault. For example, the local processor block 230 may identify a first one of the error detecting blocks 312 in pipeline that detected the fault.

Then, in decision block 730, the local processor block 230 decides whether to escalate a failure notification (e.g., the fault notification 544 illustrated in FIG. 5) to external handling facilities (e.g., the system controller 104) in the processing block (e.g., the processing block 202A). The decision in decision block 730 is "YES," when the local processor block 230 decides to escalate the failure notification. Otherwise, the decision in decision block 730 is "NO" and the local processor block 230 returns to block 702 to receive at least a new one of the instruction(s) 110 (see FIG. 1).

When the decision in decision block 730 is "YES," in block 732, the local processor block 230 transmits a fault notification (e.g., the fault notification 544 illustrated in FIG. 5) to the system controller 104 (see FIGS. 1-3, 5, 8, and 9). Then, the local processor block 230 returns to block 702 to receive at least a new one of the instruction(s) 110 (see FIG. 1). Referring to FIG. 1, after the system controller 104 receives the fault notification (e.g., in the fault notification 138), the system controller 104 may take one or more corrective actions. For example, the system controller 104 may shut off and/or reset the processing block(s) 124. In embodiments in which the processing system 102 is installed in an autonomous vehicle, the system controller 104 may return control of the autonomous vehicle to a human driver.

FIG. 8 is an illustration of a task coordination flowchart 800 depicting one of the processing block(s) 124 (see FIGS. 1 and 2) performing a functional operation, in accordance with some embodiments of the present disclosure. For ease of illustration, the processing block 202A (see FIG. 2) will be described as performing the functional operation. However, any of the processing blocks 202A-202F (see FIG. 2) may perform the functional operation illustrated in FIG. 8.

Referring to FIG. 8, the application 108 sends the first command 810 to the application API 608. For example, the first command 810 may be included in the instruction 110B (see FIG. 1). The application API 608 may decompose the first command 810 into commands that the processing blocks 202A-202F perform one or more functional operations. For ease of illustration, FIG. 8 depicts only the second command 812 that is routed to the processing block 202A. But, the application API 608 may decompose the first command 810 into commands for one or more of the processing blocks 202A-202F.

After the local processor block 230 of the processing block 202A receives the second command 812 (e.g., including the instruction 110B), the local processor block 230 of the processing block 202A sends a communication 814 to the error detecting blocks 312 of the processing block 202A that disables them. The local processor block 230 of the processing block 202A may perform the same method(s) used in optional block 706 (see FIG. 7) to disable the error detecting blocks 312 of the processing block 202A.

Then, the sub-blocks 310 of the processing block 202A each perform at least one functional operation 816 specified by the second command 812. When each of the sub-blocks 310 finish performing the functional operation(s) 816, the local processor block 230 of the processing block 202A sends an acknowledgement message 818 to the application API 608. After the application API 608 receives the acknowledgement message 818, the application API 608 sends an acknowledgement message 820 to the application 108. At this point, the local processor block 230 of the processing block 202A may receive another command (like the second command 812) that the sub-blocks 310 perform one or more functional operations and/or a command that the sub-blocks 310 perform one or more diagnostic operations.

Figure 9:
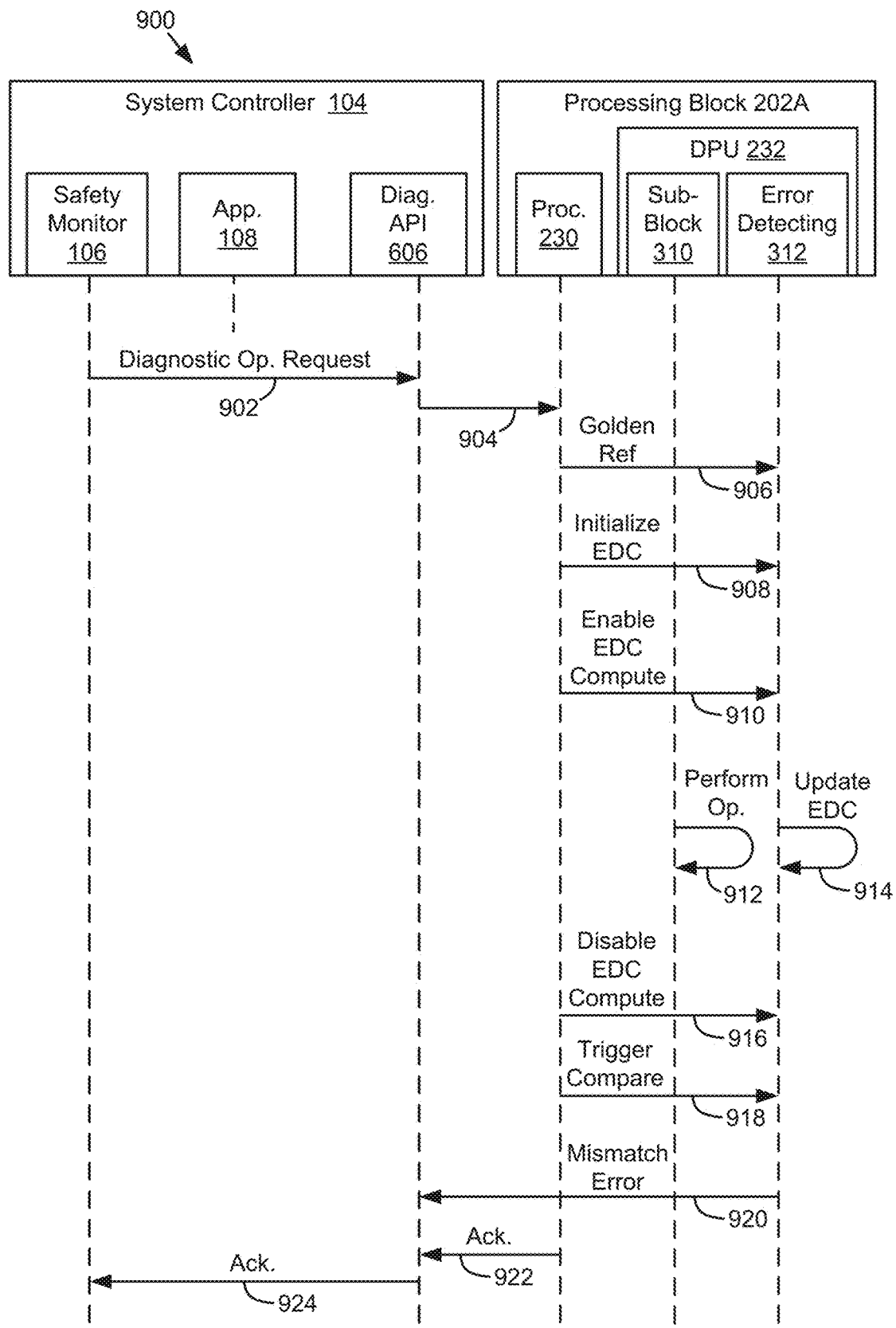
FIG. 9 is an illustration of a task coordination flowchart depicting one of the processing blocks performing a diagnostic operation, in accordance with some embodiments of the present disclosure.

FIG. 9 is an illustration of a task coordination flowchart 900 depicting one of the processing block(s) 124 (see FIGS. 1 and 2) performing a diagnostic operation, in accordance with some embodiments of the present disclosure. For ease of illustration, the processing block 202A (see FIG. 2) will be described as performing the diagnostic operation. However, any of the processing blocks 202A-202F (see FIG. 2) may perform the diagnostic operation illustrated in FIG. 9.

Referring to FIG. 9, the safety monitor 106 sends the first command 902 to the diagnostic API 606. For example, the first command 902 may be included in the instruction 110A (see FIG. 1). The diagnostic API 606 may decompose the first command 902 into commands that the processing blocks 202A-202F perform one or more diagnostic operations. For ease of illustration, FIG. 9 depicts only the second command 904 that is routed to the processing block 202A. But, the diagnostic API 606 may decompose the first command 902 into commands for one or more of the processing blocks 202A-202F. In this example, the second command 904 includes one or more golden references 906.

After the local processor block 230 of the processing block 202A receives the second command 904 (e.g., including the instruction 110A), the local processor block 230 of the processing block 202A stores the golden reference(s) 906 in the second register 506 (see FIG. 5) of at least one of the error detecting blocks 312. The local processor block 230 of the processing block 202A may perform the same method(s) used in block 712 (see FIG. 7) to store the golden reference(s) 906 in the second register 506 (see FIG. 5) of at least one of the error detecting blocks 312.

Then, the local processor block 230 of the processing block 202A sends a communication 908 to at least one of the error detecting blocks 312 that initializes the first register 504 (see FIG. 5) of the error detecting block(s). For example, the communication 908 may cause the third (control) register 508 (see FIG. 5) to store the value 532 (see FIG. 5) that initializes the first register 504 of the error detecting block(s). The local processor block 230 of the processing block 202A may perform the same method(s) used in block 714 (see FIG. 7) to initialize the first register 504 of the error detecting block(s).

Then, the local processor block 230 of the processing block 202A sends a communication 910 that enables those of the error detecting blocks 312 initialized by the communication 908. The local processor block 230 of the processing block 202A may perform the same method(s) used in optional block 716 (see FIG. 7) to enable the initialized error detecting block(s).

Next, the sub-blocks 310 of the processing block 202A perform at least one diagnostic operation 912 specified by the second command 904 and the error detecting blocks 312 determine final error detection values 914 (like the final error detection value 526 illustrated in FIG. 5). The processing block 202A may perform the same method(s) used in block 718 (see FIG. 7) to perform the diagnostic operation(s) 912 and obtain the final error detection values 914.

After the final error detection value 526 has been determined, the local processor block 230 of the processing block 202A sends a communication 916 that disables the error detecting blocks 312 of the processing block 202A. The local processor block 230 of the processing block 202A may perform the same method(s) used in optional block 706 (see FIG. 7) to disable the error detecting blocks 312 of the processing block 202A.

Then, the local processor block 230 of the processing block 202A sends a communication 918 that triggers a comparison of the final error detection value 526 to one of the golden reference(s) 906. The local processor block 230 of the processing block 202A may perform the same method(s) used in block 722 (see FIG. 7) to trigger the comparison. After the comparison, the local processor block 230 of the processing block 202A performs the same method(s) used in blocks 724-732 (see FIG. 7) and sends a fault notification 920 (e.g., the fault notification 544 illustrated in FIG. 5), if appropriate, to the diagnostic API 606. The diagnostic API 606 may forward the fault notification to the safety monitor 106. The diagnostic API 606 and/or the safety monitor 106 may cause the system controller 104 (see FIGS. 1-3, 5, 8, and 9) to take one or more corrective actions with regard to the fault.

After the sub-blocks 310 finish performing the diagnostic operation(s) 912, the local processor block 230 of the processing block 202A sends an acknowledgement message 922 to the diagnostic API 606. After the diagnostic API 606 receives the acknowledgement message 922, the diagnostic API 606 sends an acknowledgement message 924 to the safety monitor 106. At this point, the local processor block 230 of the processing block 202A may receive another command (like the second command 904) that the sub-blocks 310 perform one or more functional operations and/or a command that the sub-blocks 310 perform one or more diagnostic operations.

FIGS. 10A-10D illustrate an example autonomous vehicle 1000 that includes one or more sensors (e.g., one or more cameras). The vehicle 1000 processes a large amount of sensor data to perceive its surroundings in real-time and enable autonomous driving functions (e.g., ADAS functions). For example, the sensors may be used by the vehicle 1000 to perform ADAS functions, such as Autonomous Emergency Braking ("AEB"), Lane Keeping Assistance ("LKA"), Traffic Jam Assistance ("TJA"), and the like. The sensor(s) may be components of a front camera system of the vehicle 1000, which is described in more detail below. Alternatively and/or additionally, the sensor(s) may be components of other systems, including other camera systems such as a rear camera system, a side camera system, and the like.

The sensor(s) of the vehicle 1000 may capture data (e.g., image data, video, and the like) and provide that data to the processing system 102 (see FIG. 1) for processing. For example, the processing system 102 may implement a computer vision pipeline that processes real-time video data captured by the front camera system of the vehicle 1000. In such embodiments, referring to FIG. 1, the SoC 150 may be implemented as a SoC 1004 (FIG. 10C). Referring to FIG. 3, the sub-blocks 310 may each perform methods that are specific to processing image data flowing through the channels C1-C(M−2) and execute operations (e.g., needed by an ADAS function) in a pipeline manner. One or more of the processing block(s) 124 may be implemented as hardware acceleration blocks that help with performing operations on the video in the real-time. Examples of such operations include obtaining optical flow, noise reduction, image scaling, performing one or more image transformations, etc.

The processing system 102 may detect one or more objects of interest (e.g., pedestrians, cyclists, motorbikes, etc.) within a limited amount of time (e.g., to avoid a collision) by performing functional operations on data (e.g., high-resolution images) captured by the sensor(s) (e.g., one or more cameras) of the vehicle 1000. The processing system 102 may perform computer vision methods and/or machine learning ("ML") methods to perceive the object(s) of interest. The output of the functional operations performed by the processing system 102 may be provided to an ADAS system, which may perform one or more appropriate actions based at least in part on the output of the processing system 102.

Referring to FIG. 2, as mentioned above, the processing blocks 202A-202F may implement the VI block, the ISP block, the VIC block, the OFA block, the PVA block, and the DLA block, respectively, of a computer vision pipeline (e.g., installed in the vehicle 1000). In such embodiments, the VI block (e.g., the processing block 202A) may capture one or more camera streams carrying image data and store the image data in the memory subsystem 140. In this example, the image data may include frames captured with a wide-angle lens.

The ISP block (e.g., the processing block 202B) may obtain the image data from the memory subsystem 140, process the image data, and store ISP processed image data in the memory subsystem 140. For example, the ISP block may perform High Dynamic Range ("HDR") processing on the image data, such as local tone mapping. The ISP processed image data may include frames having 16-bit color and a YUV420 format.

The VIC block (e.g., the processing block 202C) may obtain the ISP processed image data from the memory subsystem 140, process the ISP processed image data, and store VIC processed image data in the memory subsystem 140. For example, the VIC block may perform lens distortion correction on frames of the ISP processed image data captured with a wide-angle lens.

The OFA block (e.g., the processing block 202D) may obtain the VIC processed image data from the memory subsystem 140, process the VIC processed image data, and stores OFA processed image data in the memory subsystem 140. The OFA block may perform stereo rectification on the VIC processed image data (e.g., frames captured with one or more stereo lenses), and determine optical flow (e.g., for both resulting frames) to determine motion in the scene. The VIC block may also perform a stereo rectification operation.

The PVA block (e.g., the processing block 202E) obtains the OFA processed image data from the memory subsystem 140, processes the OFA processed image data, and stores PVA processed image data in the memory subsystem 140. The PVA block may perform calculations aimed at detecting different object types based on the application (e.g., using classical computer vision algorithms).

The DLA block (e.g., the processing block 202F) obtains the PVA processed image data from the memory subsystem 140, processes the PVA processed image data, and stores DLA processed image data in the memory subsystem 140. The DLA block may perform highly parallel matrix math operations that support high speed processing of deep learning neural networks.

When used for safety critical functions, such as one or more of the ADAS functions, the processing blocks 202A-202F may be required to satisfy the requirements of one or more automotive safety standards (e.g., International Organization for Standardization ("ISO") 26262 Functional Safety Standard). Such automotive safety standard(s) may help ensure any potential risk (e.g., that deteriorates ADAS performance) is reasonably acceptable, for example, as prescribed by an applicable risk classification level defined by the automotive safety standard(s). Potential risks may include one or more hardware faults. The safety monitor 106 may schedule the diagnostic operations in accordance with any applicable automotive safety standards. For example, the diagnostic operations may be interleaved with the functional operations during an entire drive cycle that begins when the vehicle 1000 starts (e.g., after a Key-On-Test determines the vehicle 1000 is on) and ends when the vehicle 1000 stops (e.g., before a Key-Off Test determines the vehicle 1000 is off). Thus, over the entire drive cycle, the processing system 102 may alternate performing functional operations and diagnostic operations.

ISO 26262 defines four risk classification levels (also referred to as Automotive Safety Integrity Levels) ASIL-A, ASIL-B, ASIL-C, and ASIL-D, with ASIL-D being the highest risk classification level and indicating the highest level of safety. The error detecting blocks 312 combined with scheduling diagnostic operations within the FTTI may help increase the risk classification level of the processing system 102 (e.g., from ASIL-B to ASIL-C).

The automotive safety standard(s) may require and the safety monitor 106 may collect one or more quantitative measurement with regard to any faults that occur, such as a single point fault metric ("SPFM"), a latent fault metric ("LFM"), and the like. The automotive safety standard(s)

may require that the safety monitor 106 detect a hardware fault, report the hardware fault, and react to the hardware fault within an amount of time that is prescribed by the FTTI.

Referring to FIG. 3, by including the error detecting blocks 312 in the DPU 232, each of the processing blocks 202A-202F may improve fault effect observability, allow faults to be detected with greater granularity, and free up the local processor block 230 for other tasks. When the processing system 102 is a component (e.g., a computer vision pipeline) of an autonomous vehicle (e.g., the vehicle 1000 illustrated in FIGS. 10A-10D), these improvements may help increase vehicle safety.

The systems and methods described herein may be used by, without limitation, non-autonomous vehicles, semi-autonomous vehicles (e.g., in one or more adaptive driver assistance systems ("ADAS")), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 10A:
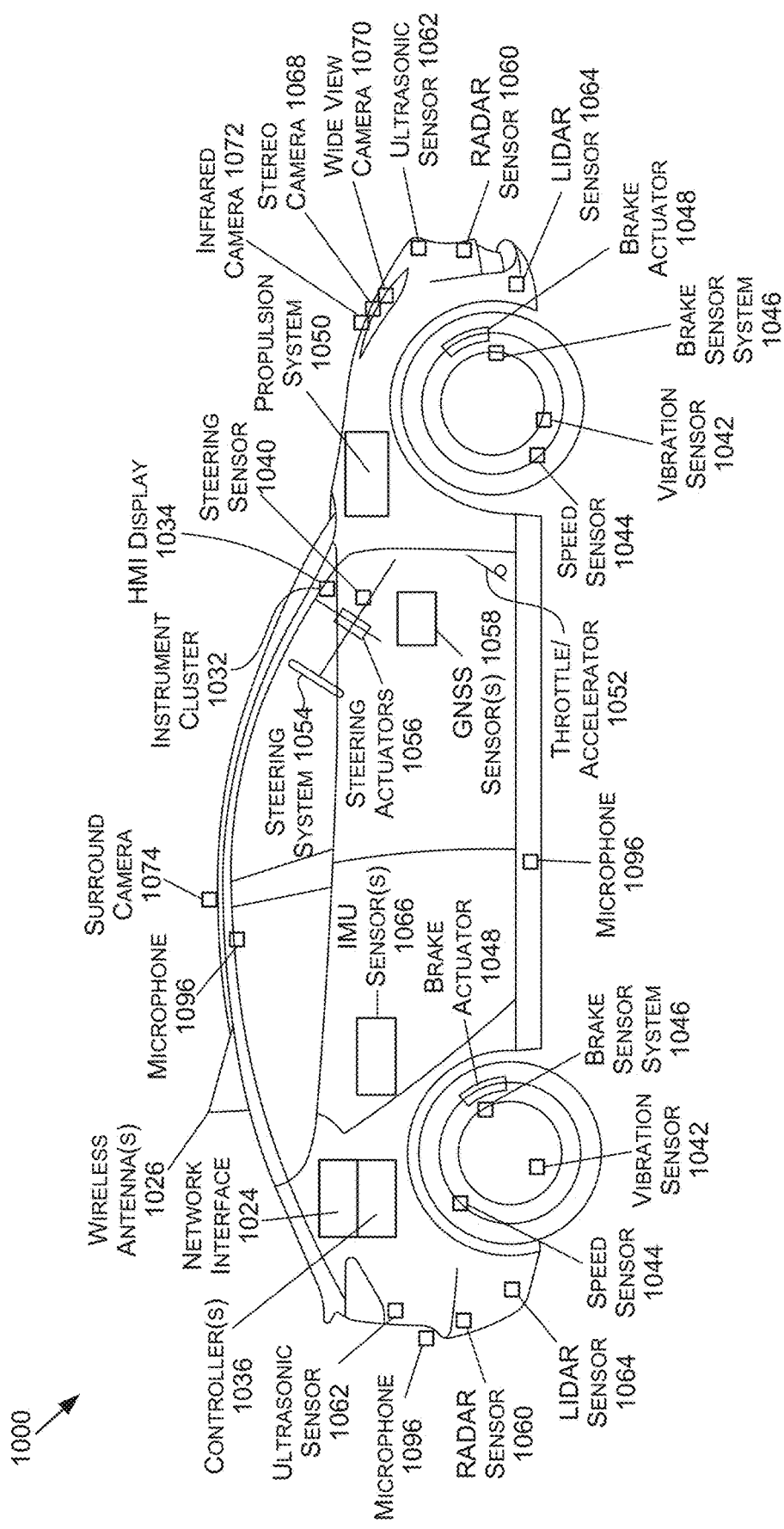
FIG. 10A is an illustration of an example autonomous vehicle, in accordance with some embodiments of the present disclosure.

FIG. 10A is an illustration of the example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. For example, the vehicle 1000 may be capable of conditional automation (Level 3), high automation (Level 4), and/or full automation (Level 5), depending on the embodiment.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more CPU(s), system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, and/or to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) 1046 (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 10C), location data (e.g., the location of the vehicle 1000, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024, which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 10B:
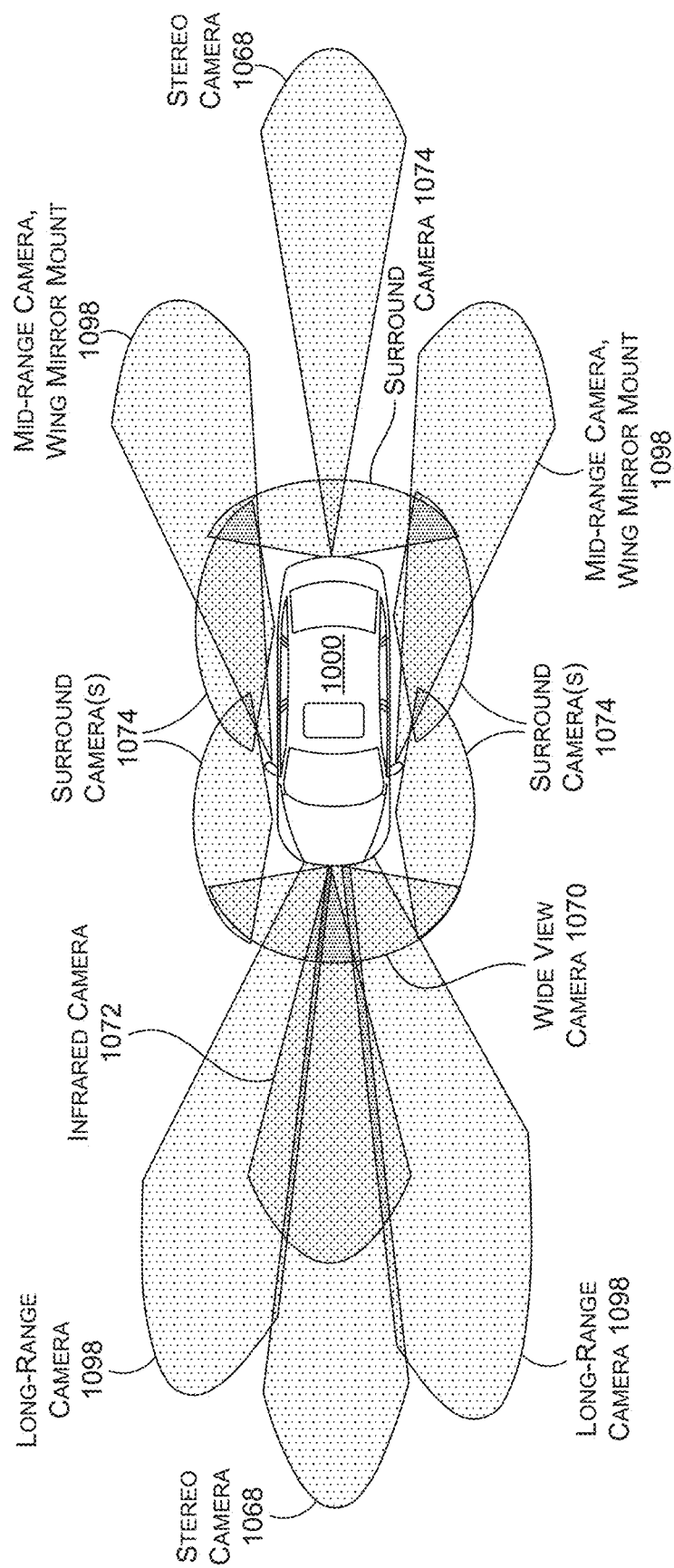
FIG. 10B is an example of camera locations and fields of view for the example autonomous vehicle of FIG. 10A, in accordance with some embodiments of the present disclosure.
Figure 10C:
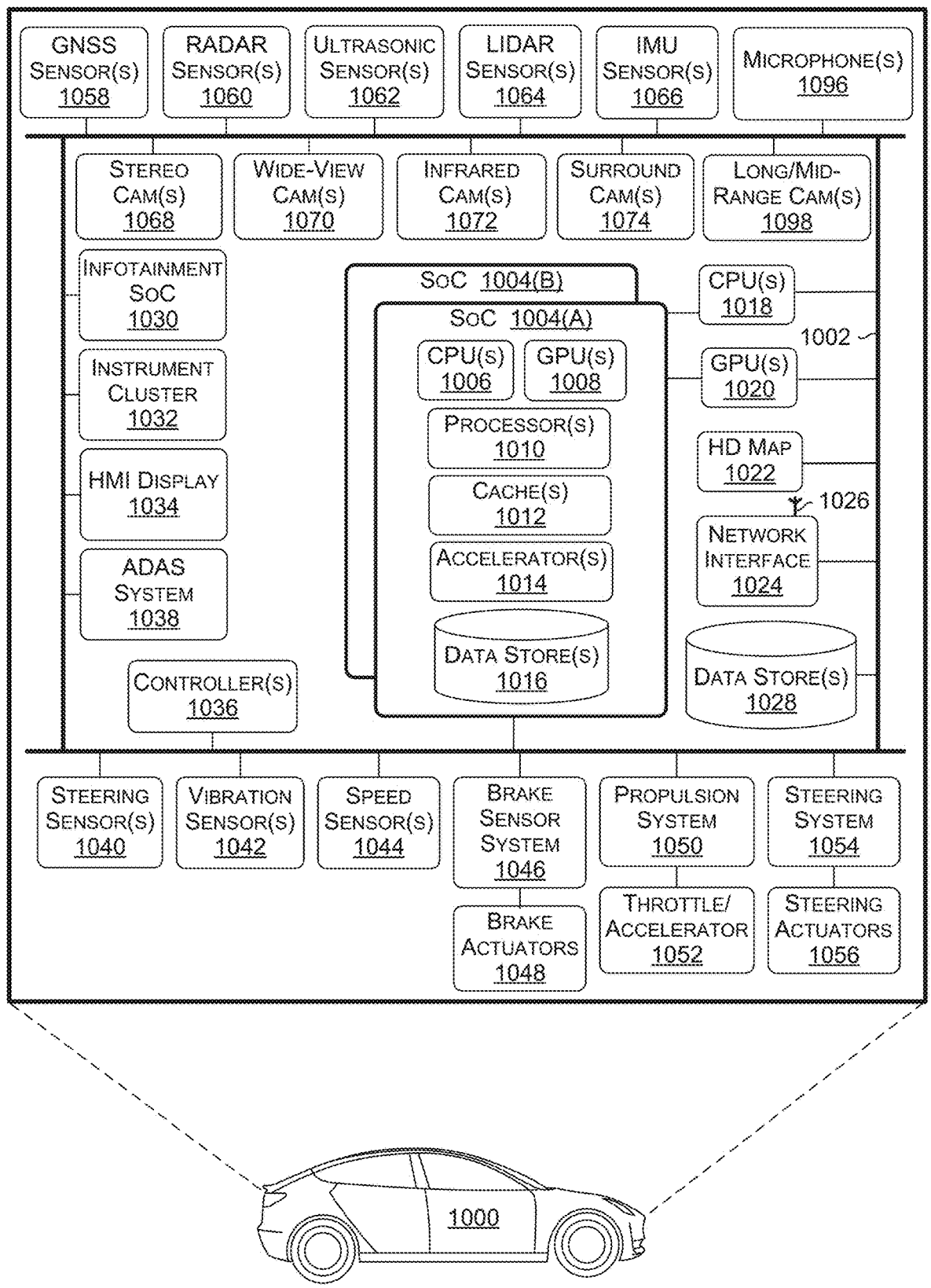
FIG. 10C is a block diagram of an example system architecture for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist, and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 1000 (e.g., front-facing cameras) may be used for surround view, to help identify forward-facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may any number of wide-view cameras 1070 on the vehicle 1000. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (e.g., FPGA) and a multi-core microprocessor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that includes portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned around the vehicle 1000. The surround camera(s) 1074 may include wide-view camera(s) 1070, fisheye camera(s), 360-degree camera(s), and/or the like. For example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround-view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C is illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000 and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use computer-based application programming interface(s)

(API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting, and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected to both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000— such as processing DNNs. In addition, the SoC(s) 1004 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g., from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1016 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe-stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and actively performing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always-on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, which use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include an SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028, which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058(e.g., GPS and/or assisted GPS sensors), to assist in mapping, perception, occupancy grid generation, and/or path planning functions. Any number of GNSS sensor(s) 1058 may be used, including, for example and without limitation, a GPS using a USB connector with an Ethernet to serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data, in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 1000 at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 100 m, with an accuracy of 2 cm-3 cm, and with support for a 100 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high-performance GPS-Aided Inertial Navigation System (GPS/INS) that combines microelectro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include an SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjusts the vehicle speed to maintain a safe distance from vehicles ahead. Lateral ACC performs distance keeping, and advises the vehicle 1000 to change lanes when necessary. Lateral ACC is related to other ADAS applications such as LC and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 1000), while the I2V communication concept provides information about traffic farther ahead. CACC systems may include either or both I2V and V2V information sources. Given the information of the vehicles ahead of the vehicle 1000, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network that is trained and thus reduces the risk of false positives, as described herein.

The vehicle 1000 may further include the infotainment SoC 1030 (e.g., an in-vehicle infotainment system (IVI)). Although illustrated and described as an SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 1000. For example, the infotainment SoC 1030 may include radios, disk players, navigation systems, video players, USB and Bluetooth connectivity, carputers, in-car entertainment, Wi-Fi, steering wheel audio controls, hands-free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe-stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
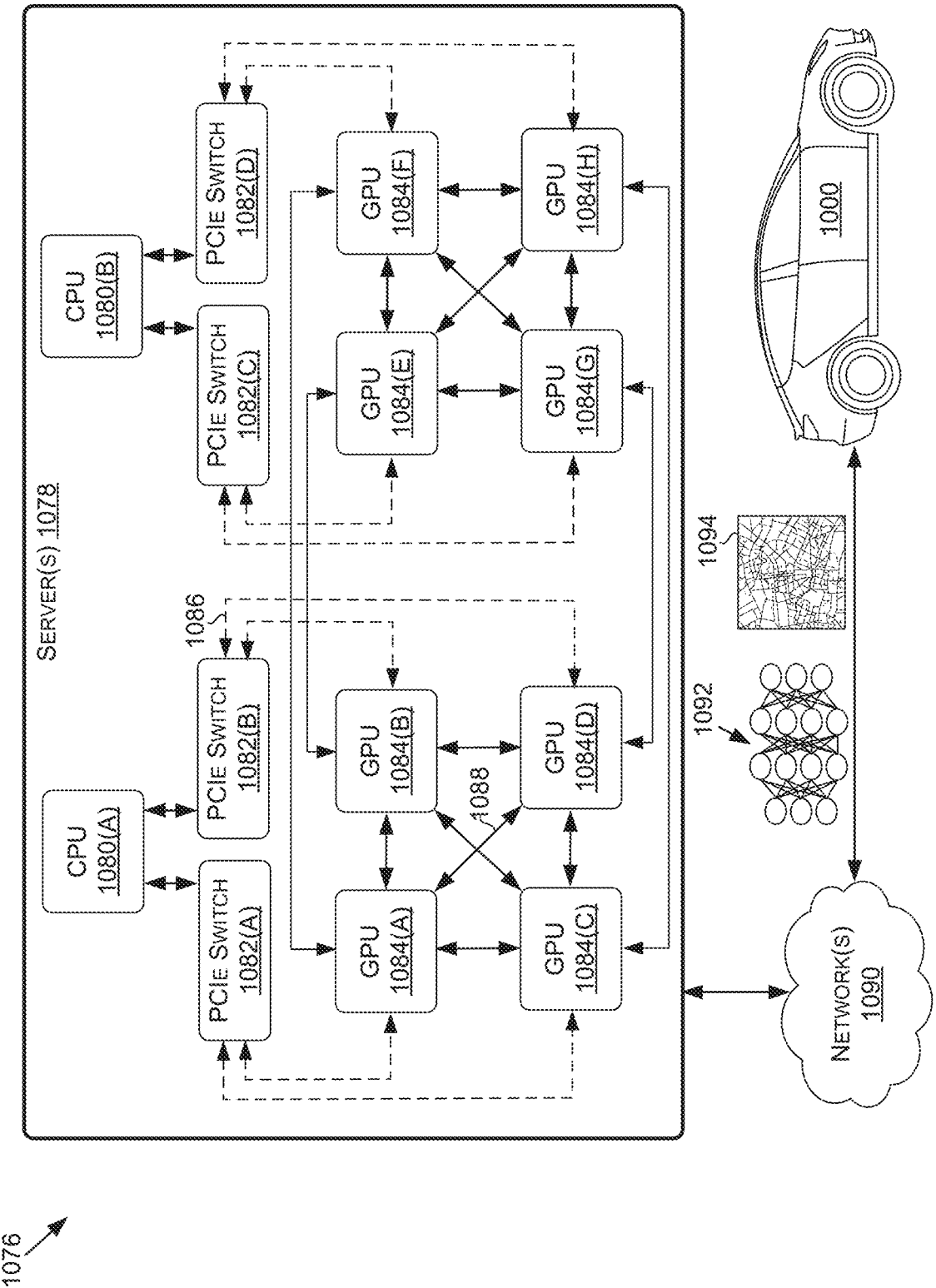
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced roadwork. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

As mentioned above, in at least one embodiment, the SoC 150 (see FIGS. 1 and 2) may be a component of the vehicle 1000. For example, the SoC 150 may implement a computer vision pipeline of the front camera system of the vehicle 1000. In such embodiments, the SoC 150 may be implemented as one of the SoCs 1004 (see FIG. 10C). Referring to FIG. 10C, the system controller 104 may be implemented by the CPU(s) 1006, the GPU(s) 1008, and/or the processor(s) 1010. The memory subsystem 140 may be implemented by the cache(s) 1012 and/or the data store(s) 1016. The processing block(s) 124 may be implemented as the accelerator(s) 1014.

Example Computing Device

Figure 11:
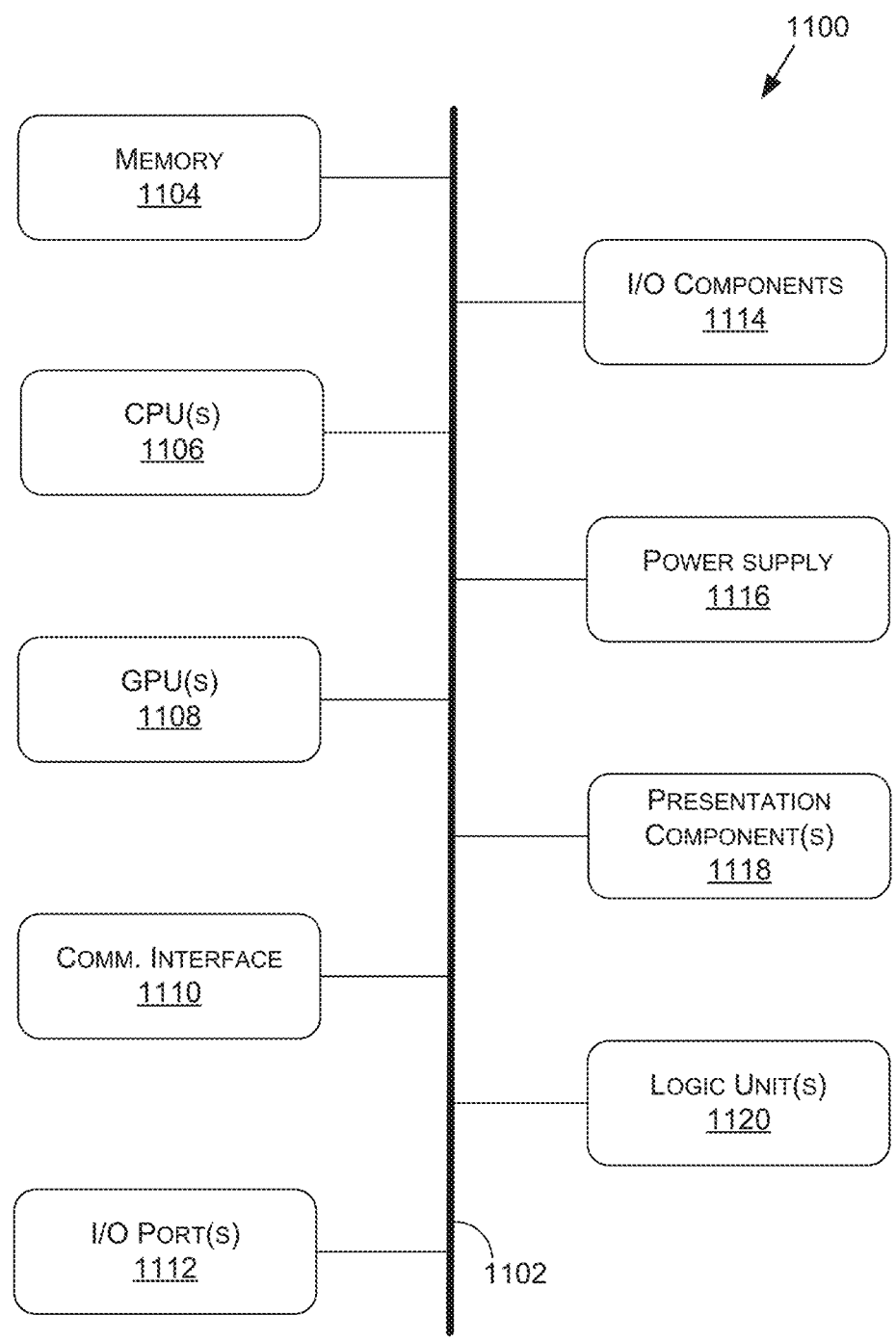
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, I/O ports 1112, input/output components 1114, a power supply 1116, one or more presentation components 1118 (e.g., display(s)), and one or more logic units 1120.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point, connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, including wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built into (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

In at least one embodiment, the simulation system 114 (see FIG. 1) may be implemented on one of the computing device(s) 1100. As mentioned above, the simulation system 114 may be implemented by processor executable instructions. In such embodiments, the instructions may be stored by the memory 1104 and executed by the CPUs 1106, the GPUs 1108, and/or the logic unit(s) 1120.

At least one embodiment of the disclosure can be described in view of the following clauses:

1. A system comprising: first circuitry comprising a plurality of sub-blocks to generate output data when the plurality of sub-blocks performs a diagnostic operation associated with predetermined error detecting data; and second circuitry comprising a plurality of error detecting blocks to generate one or more error detecting values for the output data and to compare the one or more error detecting values with the predetermined error detecting data.

2. The system of clause 1, wherein two or more sub-blocks of the plurality of sub-blocks are arranged in a series to collectively perform a functional operation with each of the two or more sub-blocks performing at least a portion of the functional operation, and wherein the two or more sub-blocks perform the diagnostic operation and the functional operation at different times.

3. The system of clause 2, wherein the predetermined error detecting data comprises a plurality of values, the output data comprises a plurality of portions, at least two portions of the output data being output by different sub-blocks of the plurality of sub-blocks, and the plurality of error detecting blocks is to generate at least one error detecting value of the one or more error detecting values for at least one portion of the plurality of portions and to compare the at least one of the error detecting value with a different one of the plurality of values.

4. The system of any one of the clauses 1-3 for use with a system controller, the system further comprising: at least one processor to compare at least one error detecting value with the predetermined error detecting data to produce at least one comparison result, the at least one processor to determine whether the at least one comparison result indicates a fault has occurred, and inform the system controller when the at least one processor determines a fault has occurred.

5. The system of clause 4 for use with an external memory system storing predetermined input data, the system further comprising: local memory; and third circuitry comprising a memory access block, the at least one processor to direct the memory access block to obtain the predetermined input data from the external memory system and store the predetermined input data in the local memory, at least one of the plurality of sub-blocks to obtain the predetermined input data from the local memory, the plurality of sub-blocks to generate the output data by processing the predetermined input data, and the memory access block to store the output data in the external memory system.

6. The system of clause 5, further comprising: fourth circuitry comprising at least one first error detecting block to generate at least one first error detecting value for the predetermined input data obtained from the external memory system and compare the at least one first error detecting value with a first portion of the predetermined error detecting data; and fifth circuitry comprising at least one second error detecting block to generate at least one second error detecting value for the output data before the output data is stored in the external memory system and compare the at least one second error detecting value with a second portion of the predetermined error detecting data.

7. The system of any one of the clauses 1-6, wherein at least one of the plurality of error detecting blocks is to generate at least one of the one or more error detecting values by performing a cyclic redundancy check on the output generated by a different one of the plurality of sub-blocks.

8. The system of any one of the clauses 1-7, wherein the predetermined error detecting data is generated by offline simulation, and at least one of the plurality of error detecting blocks comprises: a first memory location to store at least a portion of the predetermined error detecting data; a second memory location to store a particular one of the one or more error detecting values generated by the error detecting block; and comparison circuitry to compare values stored by the first and second memory locations to thereby compare the particular error detecting value with the portion of the predetermined error detecting data.

9. The system of clause 8, wherein each of the plurality of error detecting blocks comprises: a third memory location to store an instruction, the instruction to instruct the comparison circuitry of the error detecting block to compare the values stored by the first and second memory locations of the error detecting block.

10. The system of any one of the clauses 1-9, wherein the diagnostic operation comprises a Permanent Fault Software Diagnostic ("PFSD") task.

11. The system of any one of the clauses 1-10, further comprising: an autonomous vehicle comprising the first and second circuitry.

12. The system of clause 11, wherein the autonomous vehicle comprises a computer vision pipeline comprising the first and second circuitry.

13. A method comprising: performing a diagnostic operation with a first portion of a circuit to produce diagnostic output, the first portion generating one or more first intermediate values before producing the diagnostic output; generating one or more first error detecting values for the one or more first intermediate values with the first portion; and determining, using the first portion, a fault has occurred when the one or more first error detecting values do not match predetermined error detecting data.

14. The method of clause 13, further comprising: sending, with the first portion, a notification to a second portion of the circuit when a fault is determined to have occurred.

15. The method of clause 13 or 14, wherein the first portion comprises one or more error detecting blocks to generate the one or more first error detecting values, and the method further comprises: disabling the one or more error detecting blocks after the one or more error detecting blocks generate the one or more first error detecting values.

16. The method of any one of the clauses 13-15, further comprising: performing a functional operation with the first portion of the circuit to produce functional output, the first portion generating one or more second intermediate values, the first portion comprising one or more error detecting blocks to generate the one or more first error detecting values; and disabling the one or more error detecting blocks such that one or more second error detecting values are not generated for the one or more second intermediate values.

17. The method of clause 16, further comprising: enabling the one or more error detecting blocks before the one or more error detecting blocks generate the one or more first error detecting values.

18. The method of any one of the clauses 13-17, further comprising for at least one of the one or more first intermediate values: generating an error detecting code as one of the one or more first error detecting values and storing the error detecting code in a first memory location as a first value; storing a portion of the predetermined error detecting data in a second memory location as a second value; obtaining a comparison result by comparing the first value to the second value; and storing the comparison result in a third memory location accessible by at least one processor of the first portion of the circuit, the at least one processor determining whether a fault has occurred based at least in part on the comparison result.

19. The method of any one of the clauses 13-18, further comprising: generating the predetermined error detecting data by simulating performance of the diagnostic operation by the first portion.

20. A system comprising: a plurality of circuits to perform an operation, one or more of the plurality of circuits comprising a plurality of sub-circuits to generate output and detect whether a fault has occurred during the performance of the operation by generating an error detecting value for the output and determining whether the error detecting value matches a predetermined error detecting value.

21. The system of clause 20, further comprising a system controller, wherein at least one of the one or more circuits comprises at least one processor to receive an instruction from the system controller to perform a portion of the operation, the at least one processor of the at least one circuit to instruct at least one of the plurality of sub-circuits of the at least one circuit to perform at least one sub-operation after the at least one processor receives the instruction to generate the output of the sub-circuit, the at least one processor of the at least one circuit to identify a fault source one of the plurality of sub-circuits of the at least one circuit as being a source of a fault when the at least one processor obtains information indicating the fault has occurred, and the at least one processor of the at least one circuit to notify the system controller of the fault source.

22. The system of clause 20 or 21, further comprising: a system controller to instruct the plurality of circuits to perform, as the operation, a diagnostic operation or a functional operation, at least one of the one or more circuits to send a fault notification to the system controller when at least one of the plurality of sub-circuits of the at least one circuit detects a fault.

23. The system of any one of the clauses 20-22, further comprising: a plurality of hardware accelerators comprising the plurality of circuits.

24. The system of any one of the clauses 20-23, wherein the plurality of circuits is to implement a processing pipeline.

25. The system of clause 24, wherein the processing pipeline is computer vision pipeline.

26. The system of any one of the clauses 20-25, further comprising: an autonomous vehicle comprising the plurality of circuits.

27. The system of clause 26, wherein the plurality of circuits comprises at least one of a video input ("VI") circuit, an Image Sensor Processor ("ISP") circuit, a Video Image Compositor ("VIC") circuit, an Optical Flow Accelerator ("OFA") circuit, a Programmable Vision Accelerator ("PVA") circuit, or a Deep Learning Accelerator ("DLA") circuit.

28. The system of any one of the clauses 20-27, further comprising: an electrical device comprising the plurality of circuits.

29. The system of any one of the clauses 20-28, wherein the operation is a diagnostic operation, and the plurality of circuits is to perform a functional operation without the plurality of sub-circuits of at least one of the one or more circuits detecting whether a fault has occurred during performance of the functional operation.

30. The system of clause 29, further comprising: an autonomous vehicle comprising the plurality of circuits; and a system controller to alternate instructing the plurality of circuits to perform a new diagnostic operation and a new functional operation.

31. The system of clause 29 or 30, wherein the functional operation is an Advanced Driver Assistance Systems ("ADAS") operation.

32. The system of any one of the clauses 20-31 being a system on a chip implemented on a single silicon substrate.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
a first processor comprising first and second circuitry, the first circuitry of the first processor to comprise a plurality of sub-blocks to generate output data when the plurality of sub-blocks perform a diagnostic operation associated with predetermined error detecting data, the plurality of sub-blocks to be arranged in a series such that the output data of a previous sub-block of the plurality of sub-blocks is input into a next sub-block of the plurality of sub-blocks, and the second circuitry of the first processor to comprise a plurality of error detecting blocks to generate one or more error detecting values for the output data generated by the plurality of sub-blocks and to compare the error detecting values with the predetermined error detecting data; and
a second processor to receive at least one instruction from a controller, and to cause the plurality of sub-blocks of the first circuitry of the first processor to perform the diagnostic operation in response to receiving the at least one instruction.

2. The system of claim 1, wherein two or more sub-blocks of the plurality of sub-blocks are to collectively perform a functional operation with each of the two or more sub-blocks performing at least a portion of the functional operation, and
wherein the two or more sub-blocks are to perform at least a portion of the diagnostic operation and the functional operation at different times.

3. The system of claim 2, wherein the predetermined error detecting data comprises a plurality of values,
the output data comprises a plurality of portions, at least two portions of the output data being output by different sub-blocks of the plurality of sub-blocks, and
the plurality of error detecting blocks is to generate at least one error detecting value of the one or more error detecting values for at least one portion of the plurality of portions and to compare the at least one of the error detecting value with a different one of the plurality of values.

4. The system of claim 1 for use with a system controller, the system further comprising:
at least one processor to compare at least one error detecting value with the predetermined error detecting data to produce at least one comparison result, the at least one processor to determine whether the at least one comparison result indicates a fault has occurred, and inform the system controller when the at least one processor determines a fault has occurred.

5. The system of claim 4, for use with an external memory system storing predetermined input data, the system further comprising:
local memory; and
third circuitry comprising a memory access block, the at least one processor to direct the memory access block to obtain the predetermined input data from the external memory system and store the predetermined input data in the local memory, at least one of the plurality of sub-blocks to obtain the predetermined input data from the local memory, the plurality of sub-blocks to generate the output data by processing the predetermined input data, and the memory access block to store the output data in the external memory system.

6. The system of claim 5, further comprising:
fourth circuitry comprising at least one first error detecting block to generate at least one first error detecting value for the predetermined input data obtained from the external memory system and compare the at least one first error detecting value with a first portion of the predetermined error detecting data; and fifth circuitry comprising at least one second error detecting block to generate at least one second error detecting value for the output data before the output data is stored in the external memory system and compare the at least one second error detecting value with a second portion of the predetermined error detecting data.

7. The system of claim 1, wherein at least one of the plurality of error detecting blocks is to generate at least one of the one or more error detecting values by performing a cyclic redundancy check on the output data generated by a different one of the plurality of sub-blocks.

8. The system of claim 1, wherein the predetermined error detecting data is generated by offline simulation, and at least one of the plurality of error detecting blocks comprises:
a first memory location to store at least a portion of the predetermined error detecting data;
a second memory location to store a particular one of the one or more error detecting values generated by the at least one error detecting block; and
comparison circuitry to compare values stored by the first and second memory locations to thereby compare the particular error detecting value with the portion of the predetermined error detecting data.

9. The system of claim 8 wherein each of the plurality of error detecting blocks comprises:
a third memory location to store an instruction, the instruction to instruct the comparison circuitry of the error detecting block to compare the values stored by the first and second memory locations of the error detecting block.

10. The system of claim 1, wherein the diagnostic operation comprises a Permanent Fault Software Diagnostic ("PFSD") task.

11. The system of claim 1, further comprising:
an autonomous vehicle comprising the first and second circuitry.

12. The system of claim 11, wherein the autonomous vehicle comprises a computer vision pipeline comprising the first and second circuitry.

13. A method comprising:
performing a diagnostic operation using a plurality of sub-circuits of a first portion of a circuit in a first processor to produce first intermediate values output by the plurality of sub-circuits, the plurality of sub-circuits to be arranged in series such that a previous one of the first intermediate values output by a previous one of the plurality of sub-circuits is input into a next one of the plurality of sub-circuits;
generating first error detecting values for the first intermediate values with the first portion of the circuit in the first processor;
detecting, using the first portion of the circuit in the first processor, a fault has occurred when the first error detecting values do not match predetermined error detecting data; and
retrieving, using a second processor, a status indicator that the fault has occurred, and reporting detection of the fault to a controller.

14. The method of claim 13, further comprising:
sending, with the first portion of the circuit in the first processor, a notification to a second portion of the circuit when a fault is determined to have occurred.

15. The method of claim 13, wherein the first portion of the circuit in the first processor comprises one or more error detecting blocks to generate the first error detecting values, and the method further comprises:
disabling the one or more error detecting blocks after the one or more error detecting blocks generate the first error detecting values.

16. The method of claim 13, further comprising:
performing a functional operation with the first portion of the circuit to produce functional output, the first portion to generate one or more second intermediate values, the first portion comprising one or more error detecting blocks to generate the first error detecting values; and
disabling the one or more error detecting blocks such that one or more second error detecting values are not generated for the one or more second intermediate values.

17. The method of claim 16, further comprising:
enabling the one or more error detecting blocks before the one or more error detecting blocks generate the first error detecting values.

18. The method of claim 13, further comprising for at least one of the first intermediate values:
generating an error detecting code as one of the first error detecting values and storing the error detecting code in a first memory location as a first value;
storing a portion of the predetermined error detecting data in a second memory location as a second value;
obtaining a comparison result by comparing the first value to the second value; and
storing the comparison result in a third memory location accessible by at least one processor of the first portion of the circuit, the at least one processor to determine whether a fault has occurred based at least in part on the comparison result.

19. The method of claim 13, further comprising:
generating the predetermined error detecting data by simulating performance of the diagnostic operation by the first portion.

20. A system comprising:
a plurality of circuits in a first processor to perform an operation, one or more of the plurality of circuits to comprise a first plurality of sub-circuits and a second plurality of sub-circuits, the first plurality of sub-circuits to generate output, and to be arranged in series so that the output generated by a previous sub-circuit is input into a next sub-circuit of the first plurality of sub-circuits, the second plurality of sub-circuits to detect whether a fault has occurred during the performance of the operation by generating error detecting values for the output generated by the first plurality of sub-circuits and determining whether the error detecting values match predetermined error detecting values; and
a second processor to receive at least one instruction from a system controller, and cause at least a portion of the plurality of circuits of the first processor to perform the operation in response to receiving the at least one instruction to thereby detect whether the fault has occurred during the performance of the operation.

21. The system of claim 20, wherein at least one of the one or more circuits of the first processor to instruct at least one of the plurality of sub-circuits of the at least one circuit to perform at least one sub-operation after the first processor receives the instruction to generate the output of the sub-circuit,
the first processor of the at least one circuit to identify a fault source one of the plurality of sub-circuits of the at least one circuit as being a source of a fault when the first processor obtains information indicating the fault has occurred, and the first processor to notify the system controller of the fault source.

22. The system of claim 20, further comprising:

a system controller to instruct the plurality of circuits to perform, as the operation, a diagnostic operation or a functional operation, at least one of the one or more circuits to send a fault notification to the system controller when at least one of the plurality of sub-circuits of the at least one circuit detects a fault.

23. The system of claim 20, further comprising:

a plurality of hardware accelerators comprising the plurality of circuits.

24. The system of claim 20, wherein the plurality of circuits is to implement a processing pipeline.

25. The system of claim 24, wherein the processing pipeline is computer vision pipeline.

26. The system of claim 20, further comprising:

an autonomous vehicle comprising the plurality of circuits.

27. The system of claim 26, wherein the plurality of circuits comprises at least one of a video input ("VI") circuit, an Image Sensor Processor ("ISP") circuit, a Video Image Compositor ("VIC") circuit, an Optical Flow Accelerator ("OFA") circuit, a Programmable Vision Accelerator ("PVA") circuit, or a Deep Learning Accelerator ("DLA") circuit.

28. The system of claim 20, further comprising:

an electrical device comprising the plurality of circuits.

29. The system of claim 20, wherein the operation is a diagnostic operation, and the plurality of circuits is to perform a functional operation without the plurality of sub-circuits of at least one of the one or more circuits detecting whether a fault has occurred during performance of the functional operation.

30. The system of claim 29, further comprising:

an autonomous vehicle comprising the plurality of circuits; and a system controller to alternate instructing the plurality of circuits to perform a new diagnostic operation and a new functional operation.

31. The system of claim 29, wherein the functional operation is an Advanced Driver Assistance Systems ("ADAS") operation.

32. The system of claim 20, being a system on a chip implemented on a single silicon substrate.

* * * * *